US012677230B2

(12) United States Patent
Liu et al.

(10) Patent No.: US 12,677,230 B2
(45) Date of Patent: Jul. 7, 2026

(54) PRE-COMPENSATION AND QUASI CO-LOCATION FOR DOWNLINK MULTIPLE TRANSMISSION RECEPTION POINT OPERATION

(71) Applicant: QUALCOMM Incorporated, San Diego, CA (US)

(72) Inventors: Le Liu, San Jose, CA (US); Alberto Rico Alvarino, San Diego, CA (US); Xiao Feng Wang, San Diego, CA (US); Peter Gaal, San Diego, CA (US); Mostafa Khoshnevisan, San Diego, CA (US); Chiranjib Saha, San Diego, CA (US); Harikumar Krishnamurthy, San Diego, CA (US); Ayan Sengupta, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 18/148,587

(22) Filed: Dec. 30, 2022

(65) Prior Publication Data

US 2024/0224206 A1      Jul. 4, 2024

(51) Int. Cl.
| | |
|---|---|
| *H04W 56/00* | (2009.01) |
| *H04B 7/01* | (2006.01) |
| *H04B 7/022* | (2017.01) |

(52) U.S. Cl.
CPC .......... *H04W 56/0015* (2013.01); *H04B 7/01* (2013.01); *H04B 7/022* (2013.01)

(58) Field of Classification Search
None
See application file for complete search history.

(56) References Cited

U.S. PATENT DOCUMENTS

| | | | | |
|---|---|---|---|---|
| 2017/0374707 A1* | 12/2017 | Dai | .................. | H04W 56/0035 |
| 2020/0119869 A1* | 4/2020 | Taherzadeh Boroujeni | ................ | |
| | | | | H04L 5/0023 |
| 2020/0351730 A1* | 11/2020 | Park | .................. | H04W 36/0077 |
| 2020/0358540 A1* | 11/2020 | Yokomakura | ......... | H04L 5/0057 |

(Continued)

FOREIGN PATENT DOCUMENTS

| | | |
|---|---|---|
| WO | 2022031142 A1 | 2/2022 |
| WO | 2022126149 A2 | 6/2022 |
| WO | 2022155045 A1 | 7/2022 |

OTHER PUBLICATIONS

International Search Report and Written Opinion—PCT/US2023/084506 —ISA/EPO—May 16, 2024.

(Continued)

*Primary Examiner* — Nicholas Sloms
(74) *Attorney, Agent, or Firm* — Dinsmore & Shohl LLP

(57) ABSTRACT

Various aspects of the present disclosure generally relate to wireless communication. In some aspects, a network entity may cause a first transmission reception point (TRP) to transmit a first communication using a first time value derived from a first transmission configuration indicator (TCI) state including a set of first quasi co-location (QCL) parameters of the first TRP. The network entity may cause a second TRP to transmit a second communication using a timing pre-compensation value relative to the first time value. Numerous other aspects are described.

30 Claims, 18 Drawing Sheets

(56)          References Cited

U.S. PATENT DOCUMENTS

| | | | | |
|---|---|---|---|---|
| 2021/0306109 A1* | 9/2021 | Li | ........................ | H04L 27/2601 |
| 2021/0328659 A1* | 10/2021 | Luo | .................... | H04B 7/18513 |
| 2022/0007323 A1* | 1/2022 | Li | ........................ | H04B 7/1851 |
| 2022/0150858 A1* | 5/2022 | Ren | ..................... | H04L 27/2607 |
| 2022/0264662 A1* | 8/2022 | Xu | ..................... | H04B 7/18558 |
| 2022/0330330 A1* | 10/2022 | Liu | ..................... | H04W 74/085 |
| 2022/0393809 A1* | 12/2022 | Gao | ......................... | H04B 7/01 |
| 2022/0400456 A1* | 12/2022 | Kakishima | ............ | H04L 27/261 |
| 2023/0318689 A1* | 10/2023 | Xu | ........................ | H04L 5/0094 |
| | | | | 370/329 |

OTHER PUBLICATIONS

VIVO: "Further discussion on HST-SFN schemes", 3GPP TSG
RAN WG1 #106bis-e, R1-2108955, 3rd Generation Partnership
Project (3GPP), Mobile Competence Centre, 650, Route Des Lucioles,
F-06921 Sophia-Antipolis Cedex, France, vol. RAN WG1, No.
e-Meeting, Oct. 11, 2021-Oct. 19, 2021, Oct. 1, 2021, 10 Pages,
XP052057790.

* cited by examiner

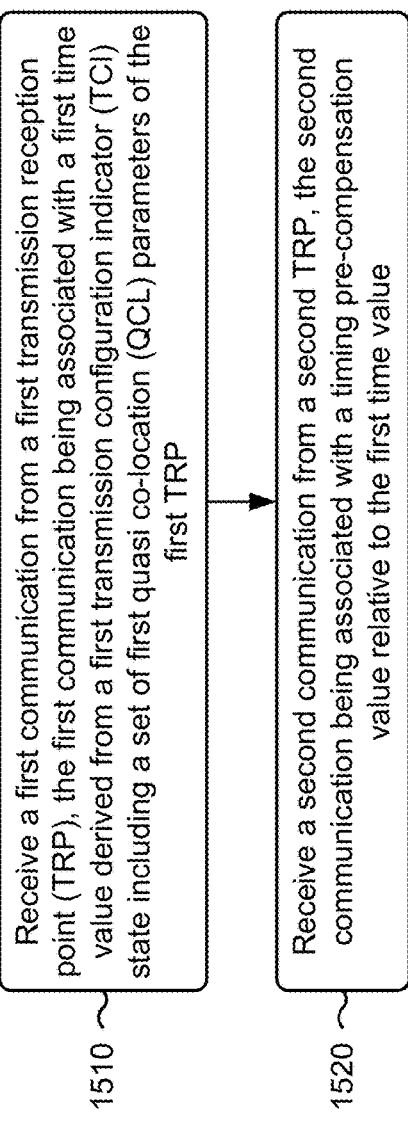

1510 — Receive a first communication from a first transmission reception point (TRP), the first communication being associated with a first time value derived from a first transmission configuration indicator (TCI) state including a set of first quasi co-location (QCL) parameters of the first TRP 1520 — Receive a second communication from a second TRP, the second communication being associated with a timing pre-compensation value relative to the first time value

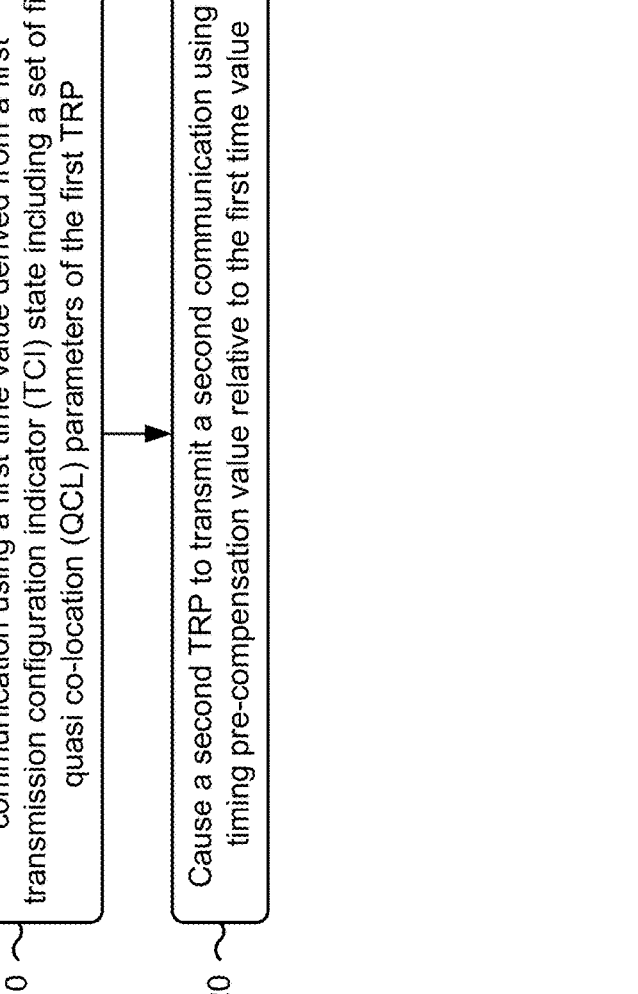

1610 Cause a first transmission reception point (TRP) to transmit a first communication using a first time value derived from a first transmission configuration indicator (TCI) state including a set of first quasi co-location (QCL) parameters of the first TRP 1620 Cause a second TRP to transmit a second communication using a timing pre-compensation value relative to the first time value

Figure 17:
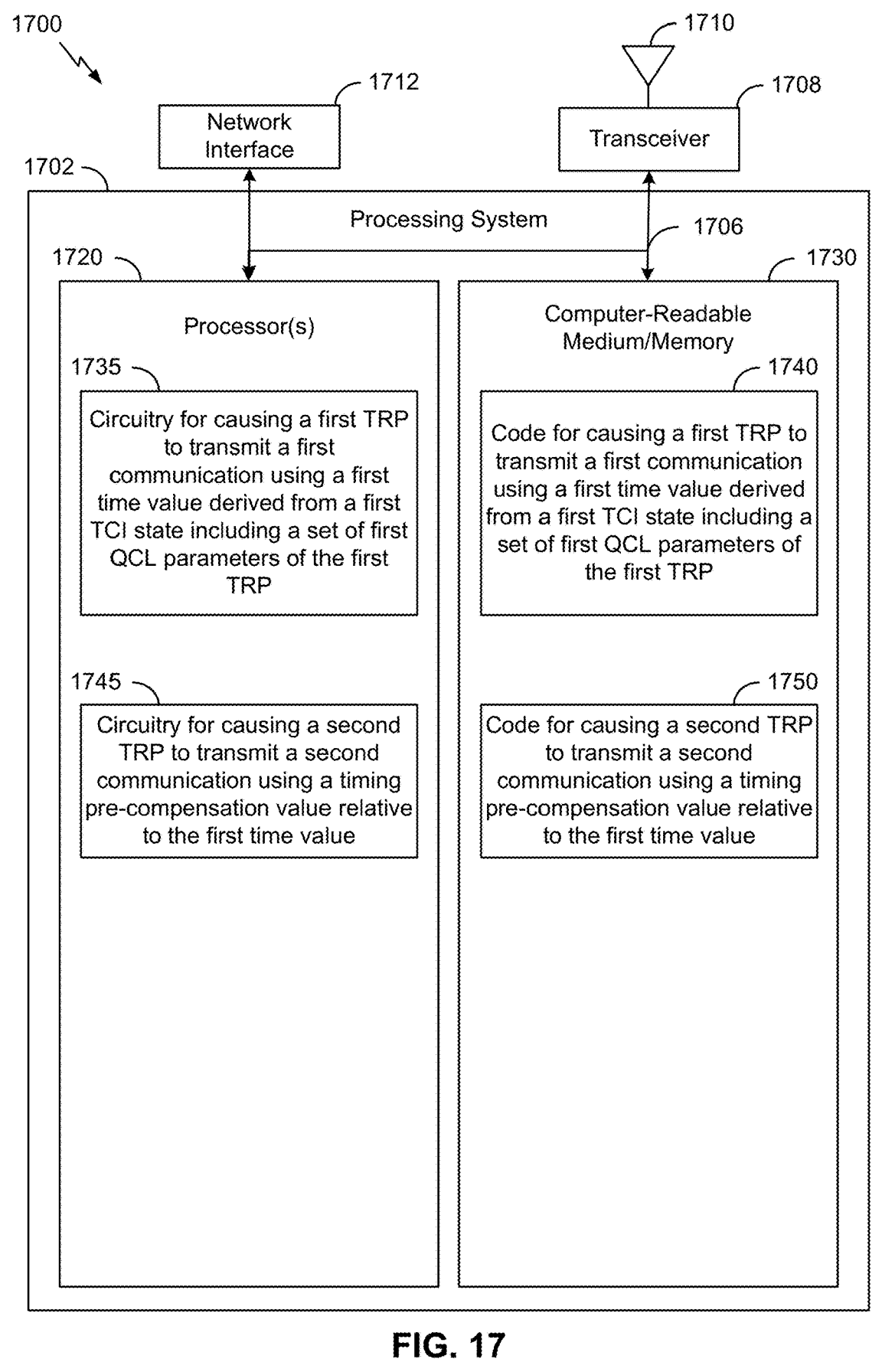

Network Interface

1708

Transceiver

1702

Processing System

1706

1720

Processor(s)

1730

Computer-Readable Medium/Memory

1735

Circuitry for causing a first TRP to transmit a first communication using a first time value derived from a first TCI state including a set of first QCL parameters of the first TRP

1740

Code for causing a first TRP to transmit a first communication using a first time value derived from a first TCI state including a set of first QCL parameters of the first TRP

1745

Circuitry for causing a second TRP to transmit a second communication using a timing pre-compensation value relative to the first time value

1750

Code for causing a second TRP to transmit a second communication using a timing pre-compensation value relative to the first time value

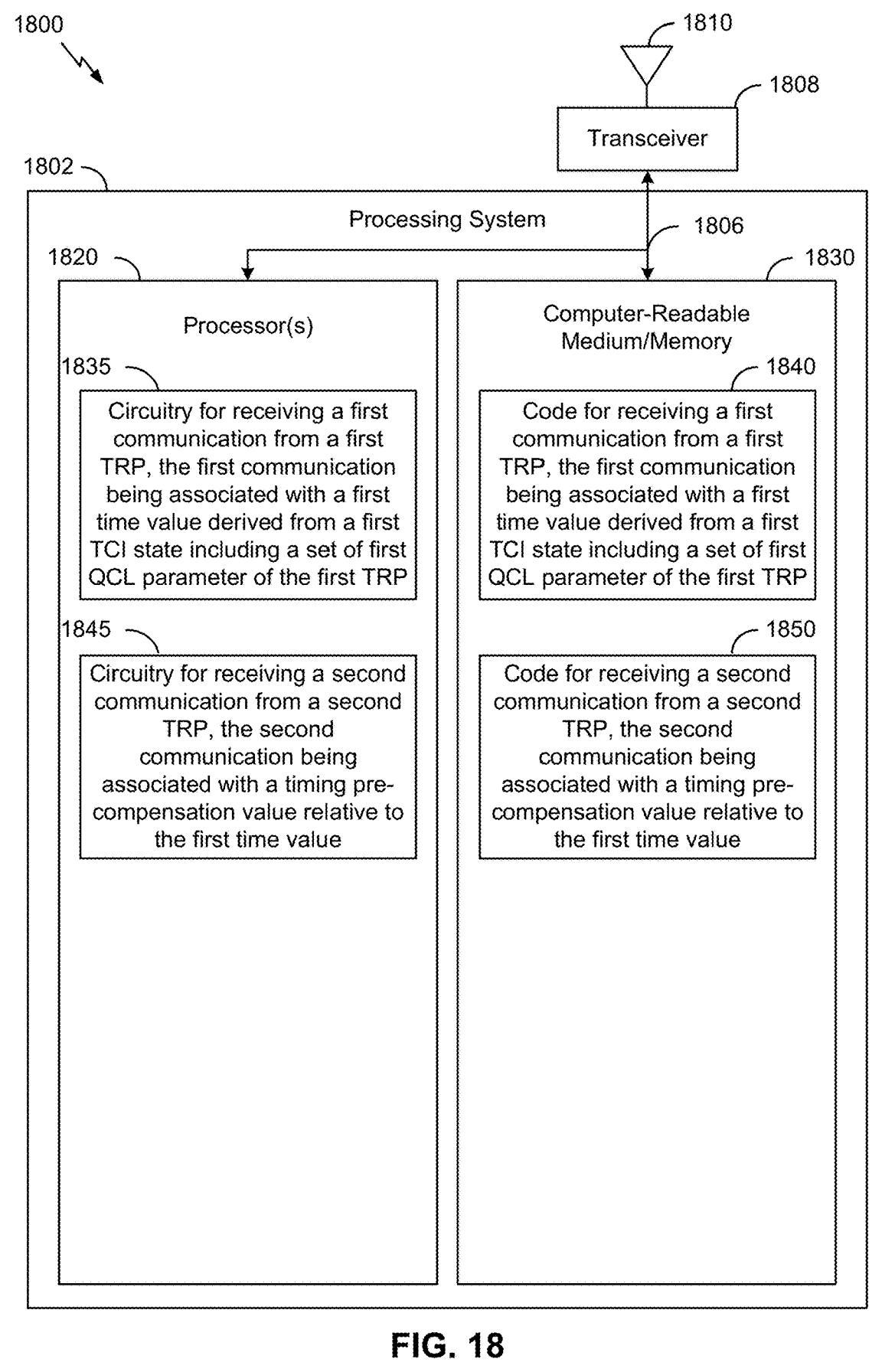

Transceiver

1802

Processing System

1806

1820

1830

Processor(s)

Computer-Readable
Medium/Memory

1835

Circuitry for receiving a first
communication from a first
TRP, the first communication
being associated with a first
time value derived from a first
TCI state including a set of first
QCL parameter of the first TRP

1840

Code for receiving a first
communication from a first
TRP, the first communication
being associated with a first
time value derived from a first
TCI state including a set of first
QCL parameter of the first TRP

1845

Circuitry for receiving a second
communication from a second
TRP, the second
communication being
associated with a timing pre-
compensation value relative to
the first time value

1850

Code for receiving a second
communication from a second
TRP, the second
communication being
associated with a timing pre-
compensation value relative to
the first time value

FIG. 18

PRE-COMPENSATION AND QUASI CO-LOCATION FOR DOWNLINK MULTIPLE TRANSMISSION RECEPTION POINT OPERATION

FIELD OF THE DISCLOSURE

Aspects of the present disclosure generally relate to wireless communication and to techniques and apparatuses for pre-compensation and quasi co-location for downlink multiple transmission reception point (TRP) operation.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving a first communication from a first transmission reception point (TRP), the first communication being associated with a first time value derived from a first transmission configuration indicator (TCI) state including a set of first quasi co-location (QCL) parameters of the first TRP. The method may include receiving a second communication from a second TRP, the second communication being associated with a timing pre-compensation value relative to the first time value Another aspect provides a method for wireless communication by a network entity. The method includes causing a first TRP to transmit a first communication using a first time value derived from a first TCI state including a set of first QCL parameters of the first TRP. The method may include causing a second TRP to transmit a second communication using a timing pre-compensation value relative to the first time value.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 15 shows a method for wireless communications by a UE.

FIG. 16 shows a method for wireless communications by a network entity, such as BS, or a disaggregated base station as discussed with respect to FIG. 3.

FIG. 17 is a diagram illustrating an example of an implementation of code and circuitry for a communications device, in accordance with the present disclosure.

FIG. 18 is a diagram illustrating an example of an implementation of code and circuitry for a communications device, in accordance with the present disclosure.

DETAILED DESCRIPTION

Figure 1:
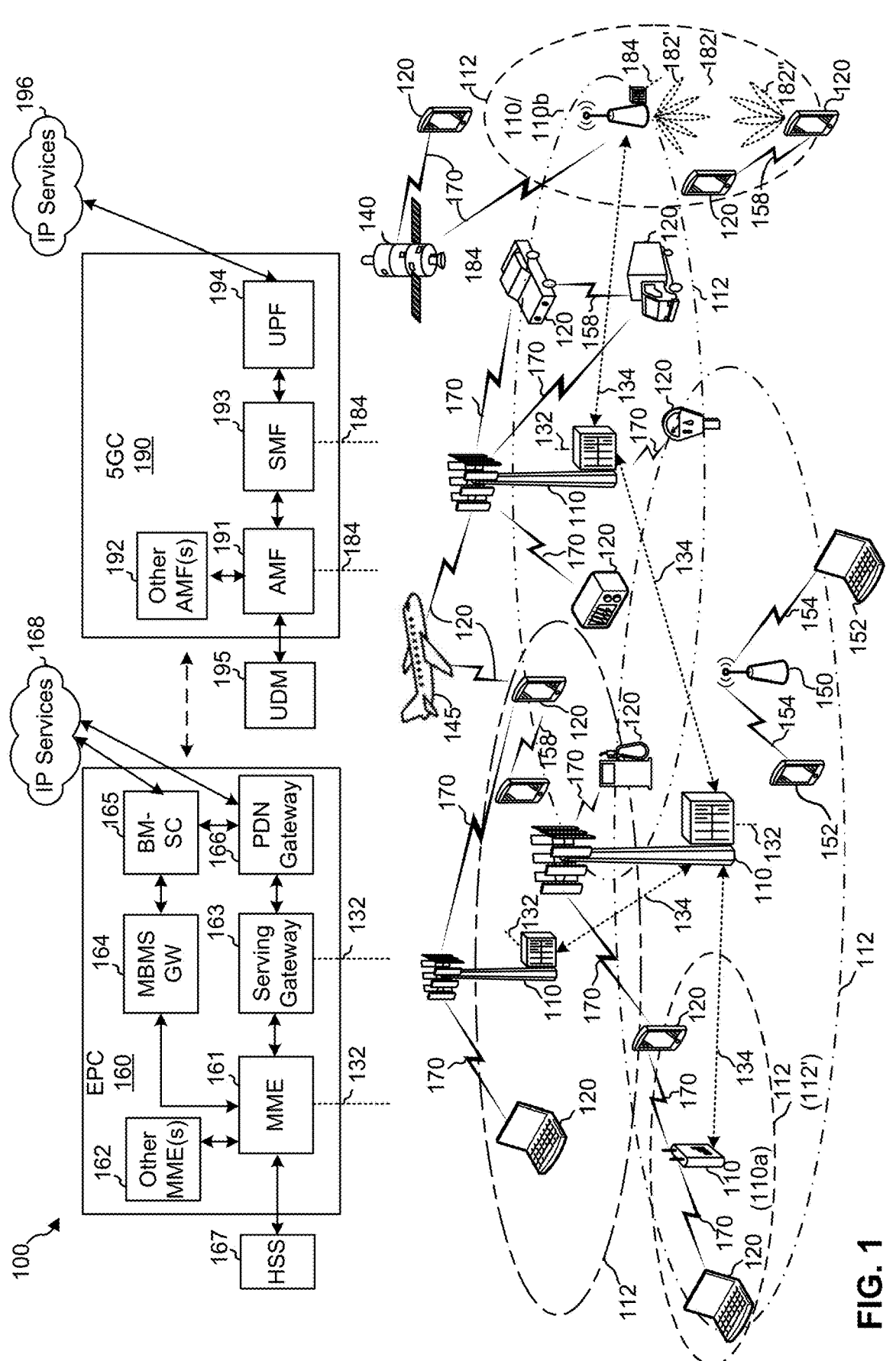
FIG. 1 depicts an example of a wireless communications network, in accordance with the present disclosure.

Aspects of the present disclosure provide apparatuses, methods, processing systems, and computer-readable mediums for pre-compensation and quasi co-location for downlink multiple transmission reception point (TRP) operation.

A network can use multiple TRPs to communicate with a UE. In some examples, the multiple TRPs may be at different locations and/or may be in motion (potentially in different directions and/or at different velocities). In some examples, transmissions of the different TRPs may be expected to arrive at the UE within a certain time window of one another. A UE may experience a different time of arrival of communications when synchronizing and communicating with a first TRP than when synchronizing and communicating with a second TRP. Additionally, or alternatively, a UE may experience a different received frequency of communications when synchronizing and communicating with a first TRP than when synchronizing and communicating with a second TRP. These differences may be due to different Doppler shifts (arising from different velocities of the first TRP and the second TRP relative to the UE), different distances between the UE and the first TRP versus the UE and the second TRP (arising from different locations of the first TRP and the second TRP), or a combination thereof. These differences may be exacerbated at the edge of a coverage area of the multiple TRPs. The differences in Doppler shift and/or distance may lead to interference between transmissions of the first TRP and the second TRP and violation of maximum time difference (such as maximum receive time difference and/or maximum transmit time difference) limitations between the first TRP and the second TRP. These differences may be particularly problematic in situations involving large cells and high TRP velocities, such as non-terrestrial networks (NTNs).

Some techniques described herein provide timing pre-compensation and/or frequency pre-compensation (e.g., quasi co-location indication or adjustment of a time or frequency indicated by a quasi co-location parameter) for multiple TRPs, such as in an inter-satellite downlink multiple TRP deployment for an NTN. For example, some techniques described herein provide pre-compensation for a second TRP relative to a first TRP, such that a maximum time difference between transmissions of the first TRP and transmissions of the second TRP is lower than a threshold. Furthermore, some techniques described herein provide indication of time parameters and/or frequency parameters (e.g., transmission configuration indicator (TCI) states) for downlink transmissions of different TRPs, such that timing pre-compensation, frequency pre-compensation, or a combination thereof can be indicated for SSB transmissions, TRS transmissions, and/or other transmissions of the first TRP and the second TRP.

Thus, differences in Doppler shift and/or distance may be mitigated, leading to decreased interference, improved communication performance, and a larger usable coverage area than if pre-compensation is not applied. Furthermore, the indication of TCI states for downlink transmissions of different TRPs (as described in connection with FIGS. 12-14) may reduce overhead and latency relative to explicit indication of each TCI state and each quasi co-location parameter applicable for multiple TRPs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/ actuator, a display, an internet of things (IOT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
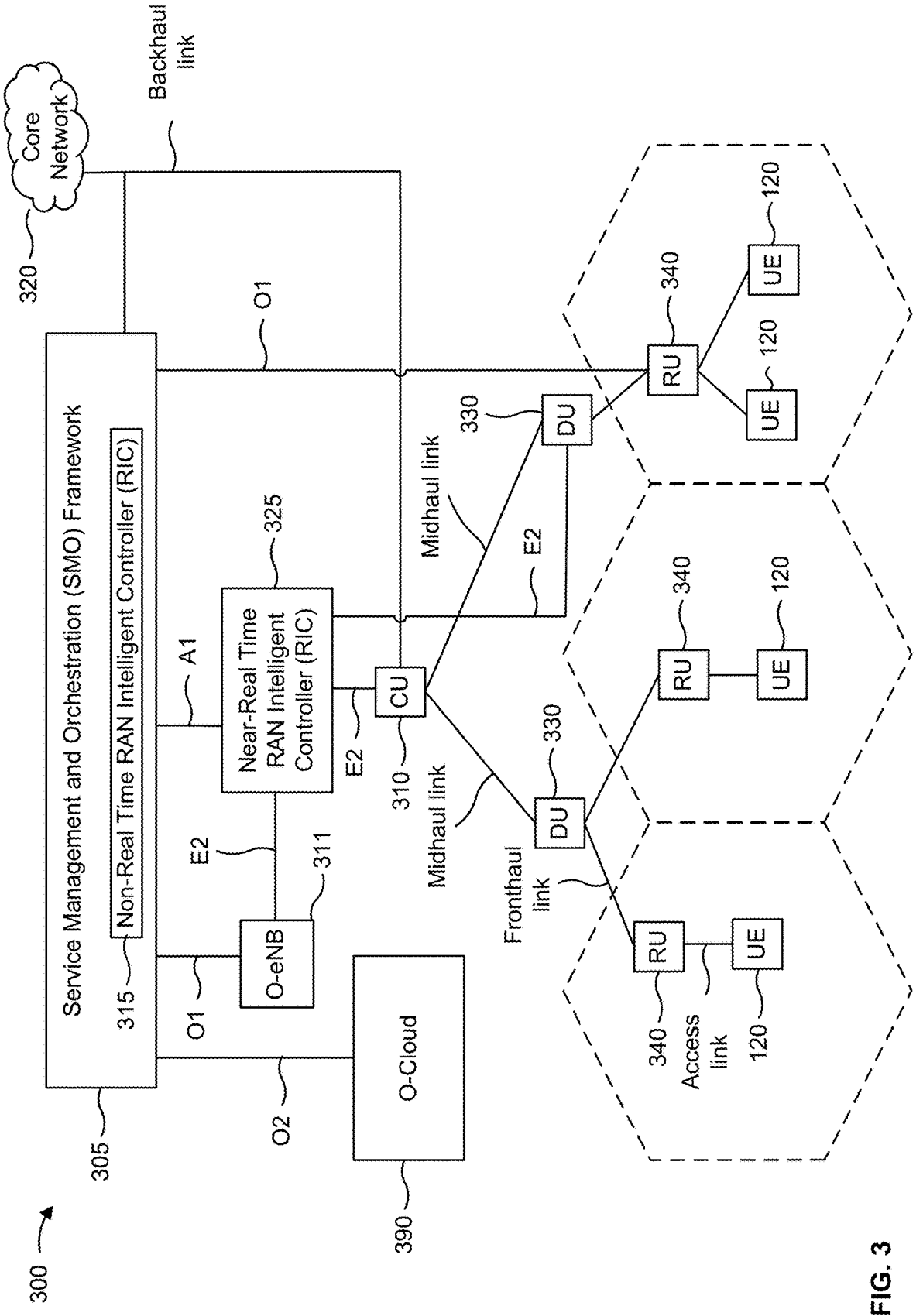
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHZ, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a TRP, or a combination thereof, to name a few examples.

As indicated above, FIG. 1 is provided as an example. Other examples may differ from what is described with regard to FIG. 1.

Figure 2:
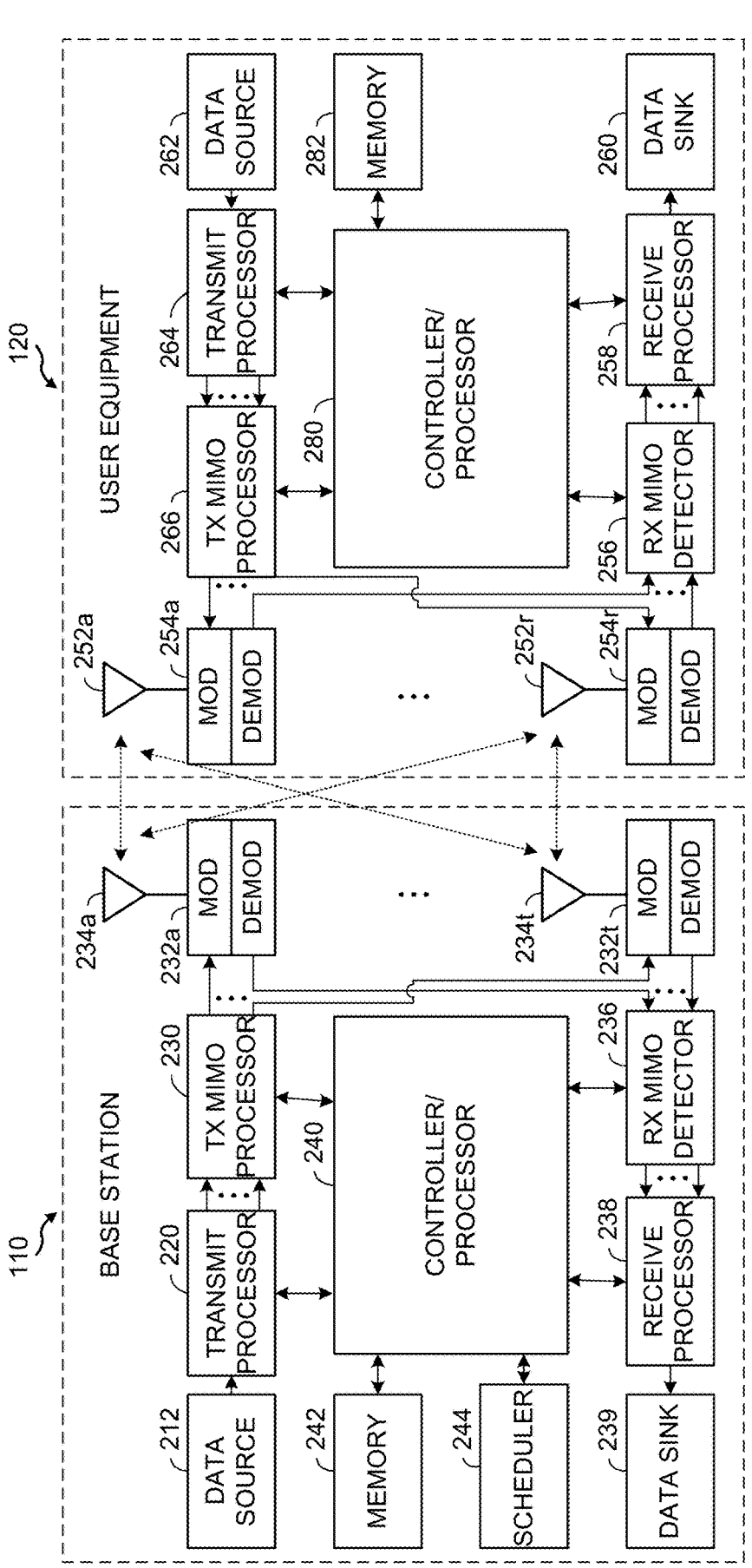
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, receive (RX) MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units.

Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface).

Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
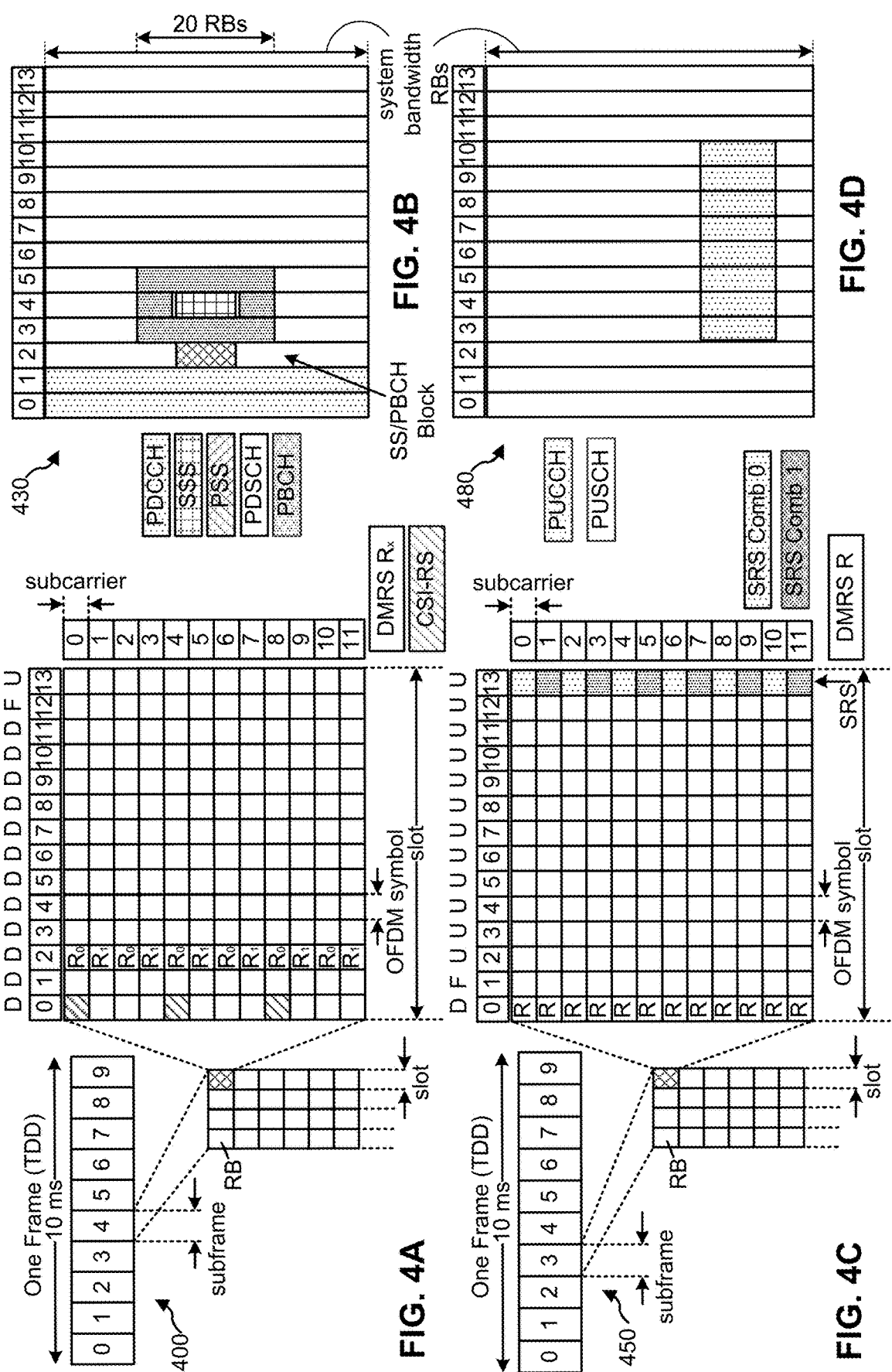
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex, in which, for a particular set of subcarriers, subframes within the set of subcarriers are dedicated for both DL and UL.

In FIGS. 4A and 4C, the wireless communications frame structure is TDD where Dis DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as a synchronization signal block (SSB)). The MIB provides a number of RBs in the system bandwidth and a system frame number. The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement/negative acknowledgement (ACK/NACK) feedback. The PUSCH carries data, and may additionally be used to carry a buffer status report (BSR), a power headroom report (PHR), and/or UCI.

Figure 5:
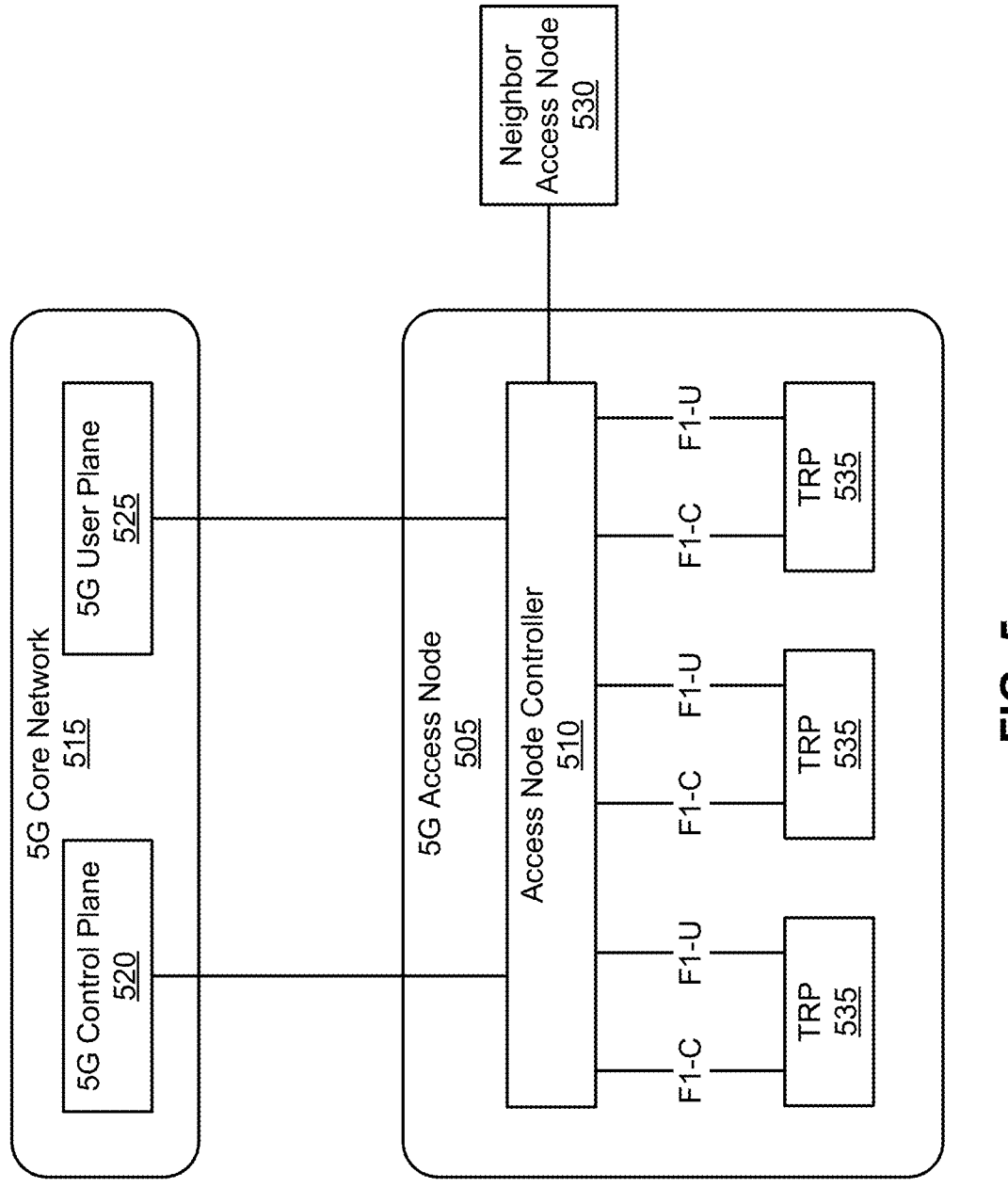
FIG. 5 illustrates an example logical architecture of a distributed radio access network, in accordance with the present disclosure.

FIG. 5 illustrates an example logical architecture of a distributed RAN 500, in accordance with the present disclosure.

A 5G access node 505 may include an access node controller 510. The access node controller 510 may be a CU of the distributed RAN 500. In some aspects, a backhaul interface to a 5G core network 515 may terminate at the access node controller 510. The 5G core network 515 may include a 5G control plane component 520 and a 5G user plane component 525 (e.g., a 5G gateway), and the backhaul interface for one or both of the 5G control plane and the 5G user plane may terminate at the access node controller 510. Additionally, or alternatively, a backhaul interface to one or more neighbor access nodes 530 (e.g., another 5G access node 505 and/or an LTE access node) may terminate at the access node controller 510.

The access node controller 510 may include and/or may communicate with one or more TRPs 535 (e.g., via an F1 Control (F1-C) interface and/or an F1 User (F1-U) interface). A TRP 535 may include a DU and/or an RU of the distributed RAN 500. In some aspects, a TRP 535 may correspond to a base station 110 described above in connection with FIG. 1. For example, different TRPs 535 may be included in different base stations 110. Additionally, or alternatively, multiple TRPs 535 may be included in a single base station 110. In some aspects, a base station 110 may include a CU (e.g., access node controller 510) and/or one or more DUs (e.g., one or more TRPs 535). In some cases, a TRP 535 may be referred to as a cell, a panel, an antenna array, or an array.

A TRP 535 may be connected to a single access node controller 510 or to multiple access node controllers 510. In some aspects, a dynamic configuration of split logical functions may be present within the architecture of distributed RAN 500, referred to elsewhere herein as a functional split. For example, a PDCP layer, an RLC layer, and/or a MAC layer may be configured to terminate at the access node controller 510 or at a TRP 535.

In some aspects, multiple TRPs 535 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different precoding parameters, different beamforming parameters, different Doppler delays, different Doppler spreads, different average delays, different delay spreads, or the like). In some aspects, a TCI state may be used to indicate one or more QCL relationships. A TRP 535 may be configured to individually (e.g., using dynamic selection) or jointly (e.g., using joint transmission with one or more other TRPs 535) serve traffic to a UE 120.

As indicated above, FIG. 5 is provided as an example. Other examples may differ from what was described with regard to FIG. 5.

Figure 6:
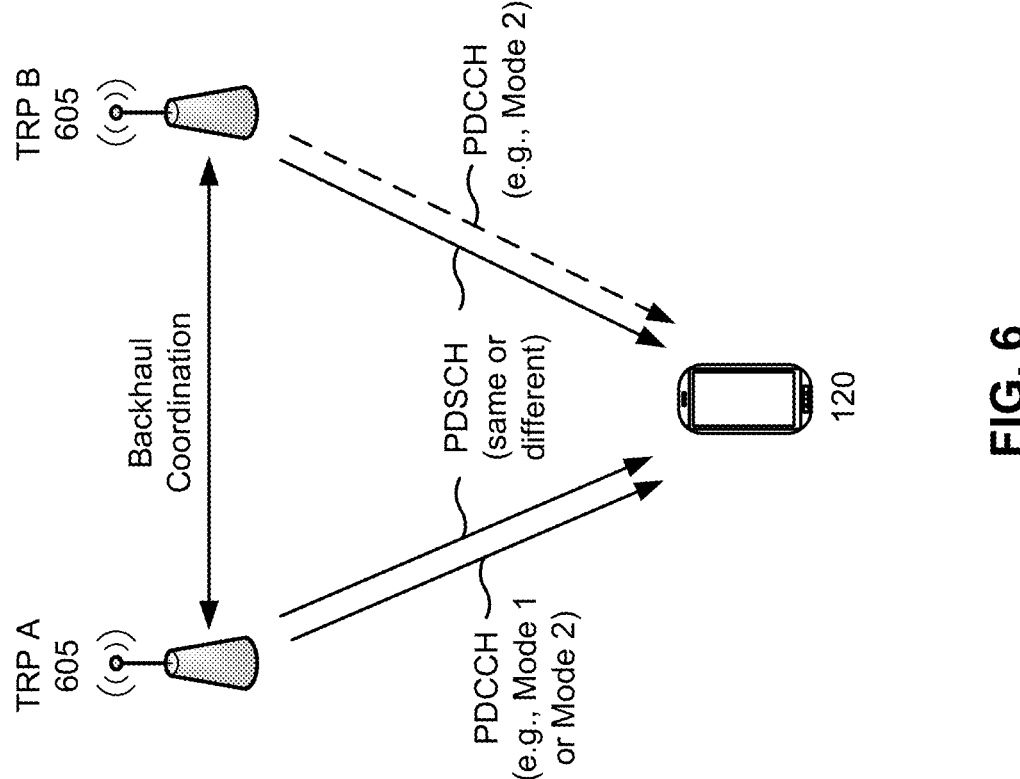
FIG. 6 is a diagram illustrating an example of multiple transmission reception point (TRP) communication, in accordance with the present disclosure.

FIG. 6 is a diagram illustrating an example 600 of multi-TRP communication (sometimes referred to as multi-panel communication), in accordance with the present disclosure. As shown in FIG. 6, multiple TRPs 605 may communicate with the same UE 120. A TRP 605 may correspond to a TRP 535 described above in connection with FIG. 5.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller 510). The interface may have a smaller delay and/or higher capacity when the TRPs 605 are co-located at the same base station 110 (e.g., when the TRPs 605 are different antenna arrays or panels of the same base station 110), and may have a larger delay and/or lower capacity (as compared to co-location) when the TRPs 605 are located at different base stations 110. The different TRPs 605 may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

In some deployments, different TRPs may have the same PCI. In such deployments, SSBs from neighbor cells (which have different PCIs than a serving cell) may not be used as a QCL source in the serving cell. In such deployments, a QCL source (e.g., a top QCL source) for a TRS, a CSI-RS, and/or a DMRS may be the serving cell's SSB. A periodic TRS may be quasi-co-located with an SSB (with regard to QCL-Type C and QCL-Type D, which indicate an average delay and a Doppler shift, and a spatial parameter, respectively). Different TRPs having the same PCI may support single-DCI and multi-DCI based frameworks.

In some deployments, different TRPs may have different PCIs. In such deployments, SSBs from a neighbor cell (with a different PCI than a serving cell) can be used as a QCL source in the serving cell. A neighbor cell's SSB can be used as a QCL source (e.g., as indicated by a "QCL referenceSignal" parameter) in a TCI state and/or a QCL-info parameter. A number of additional PCIs (e.g., up to 7 additional PCIs, in some deployments) can be configured (e.g., via RRC signaling). In some deployments, at most one additional PCI can be active. A center frequency, subcarrier spacing (SCS), and system frame number offset may be assumed to be the same as the serving cell's SSB. SSB time domain positions and periodicities of the cells with the additional PCIs can be the same as, or different than, that of the serving cell's SSB. With a multi-DCI based framework, the serving cell's PCI and the neighbor cell's PCI may be mapped to different CORESETPoolIndex values, as described below.

In some deployments, multiple TRPs may provide connectivity in a high-speed train (HST) and/or single frequency network (SFN) scenario. A TRP-specific tracking reference signal (TRS) may be used to improve the channel estimation and tracking for UEs in a HST, which may provide channel estimation and tracking up to, for example, 500 km/h (corresponding to a Doppler shift of 1.6 kHz at a frequency of 3.5 GHZ). The multiple TRPs may support a first scheme (sfnSchemeA) and/or a second scheme (sfnSchemeB), which may be configured by RRC signaling. In sfnSchemeA, there may be two TCI states (one per TRP), each with a respective QCL Type-A. Time tracking may be based on combined channel impulse responses (CIRs) of both TRSs. A UE may determine (e.g., extract) Doppler shifts and/or spreads from each TRS, and may enhance DMRS time interpolation and/or extrapolation using a formula $R_{tt} = \alpha_1 e^{-j2\pi(f_1)t} J_0(2\pi d_1 t) + \alpha_2 e^{-j2\pi(f_2)t} J_0(2\pi f d_2 t)$. Additionally, each TCI state may be associated with (e.g., indicate) a QCL-Type D parameter for an FR2 receive beam of the UE. In sfnSchemeB, differential frequency pre-compensation may be based on network entity implementation (e.g., using UL SRSs, UL DMRSs, or the like). The UE may receive two TCI states, each indicating a QCL Type-A per TRP (a first QCL-Type A parameter for a first TRP and a second QCL-Type A parameter for a second TRP). The UE may ignore (e.g., not use, not store) the Doppler QCL parameters of the second TCI state (e.g., the TCI state of a non-serving TRP). Frequency tracking may be based on the first TCI state, and time tracking may be based on combined CIRs of TRSs transmitted by the first TRP and the second TRP.

As indicated above, FIG. 6 is provided as an example. Other examples may differ from what is described with respect to FIG. 6.

Figure 7:
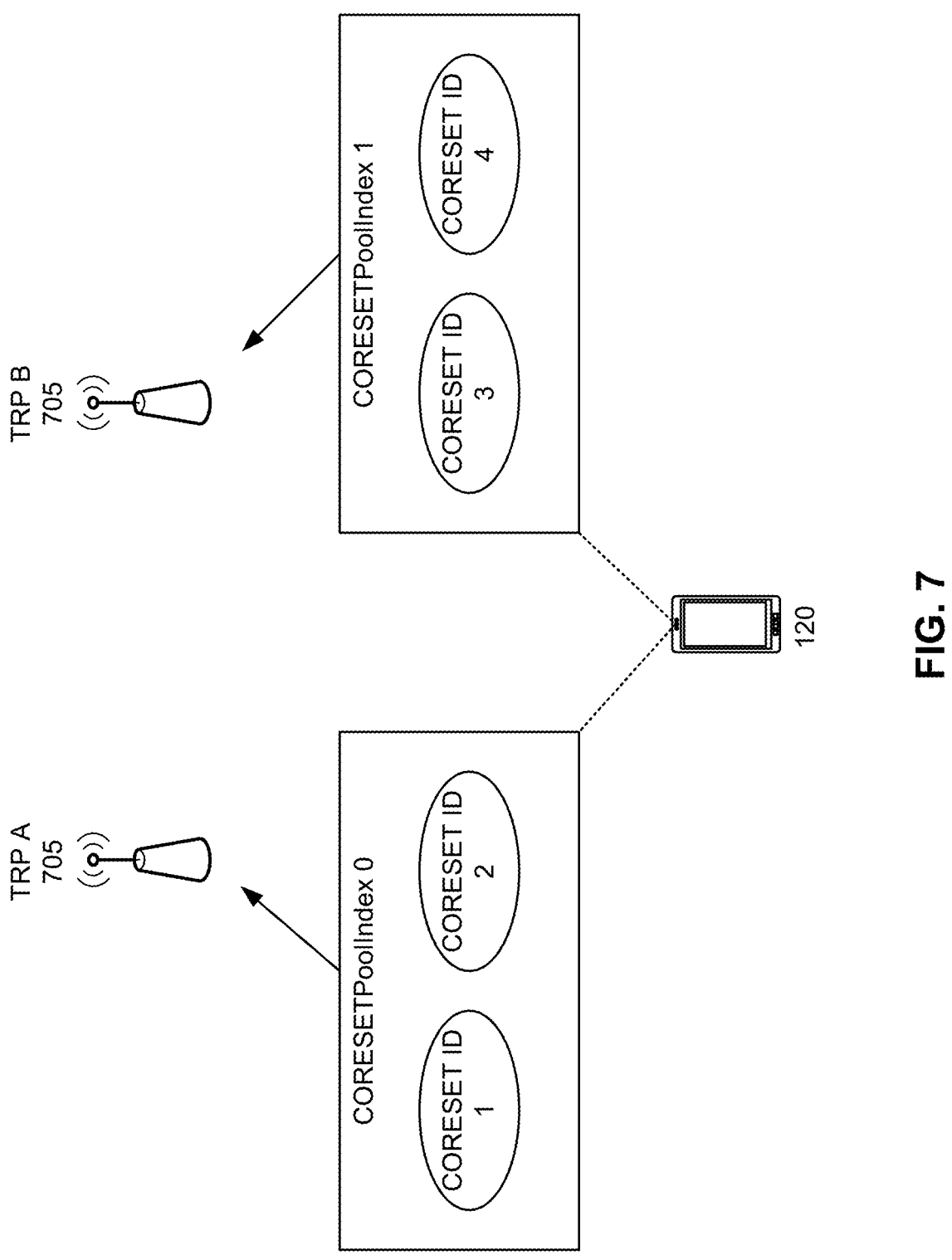
FIG. 7 is a diagram illustrating an example of TRP differentiation at a UE based at least in part on a control resource set (CORESET) pool index, in accordance with the present disclosure.

FIG. 7 is a diagram illustrating an example of TRP differentiation at a UE based at least in part on a CORESET pool index, in accordance with the present disclosure. In some aspects, a CORESET pool index (or CORESET-PoolIndex) value may be used by a UE (a UE 120) to identify a TRP associated with an uplink grant received on a PDCCH.

A CORESET may refer to a control region that is structured to support an efficient use of resources, such as by flexible configuration or reconfiguration of resources for one or more PDCCHs associated with a UE. In some aspects, a CORESET may occupy the first symbol of an OFDM slot, the first two symbols of an OFDM slot, or the first three symbols of an OFDM slot. Thus, a CORESET may include multiple RBs in the frequency domain, and either one, two, or three symbols in the time domain. In 5G, a quantity of resources included in a CORESET may be flexibly configured, such as by using RRC signaling to indicate a frequency domain region (for example, a quantity of resource blocks) or a time domain region (for example, a quantity of symbols) for the CORESET.

As illustrated in FIG. 7, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 7, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 705. As an example, and as illustrated in FIG.

7, a first TRP 705 (TRP A) (or a first base station 110) may be associated with CORESET pool index 0 and a second TRP 705 (TRP B) (or a second base station 110) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

As indicated above, FIG. 7 is provided as an example. Other examples may differ from what is described with respect to FIG. 7.

Figure 8:
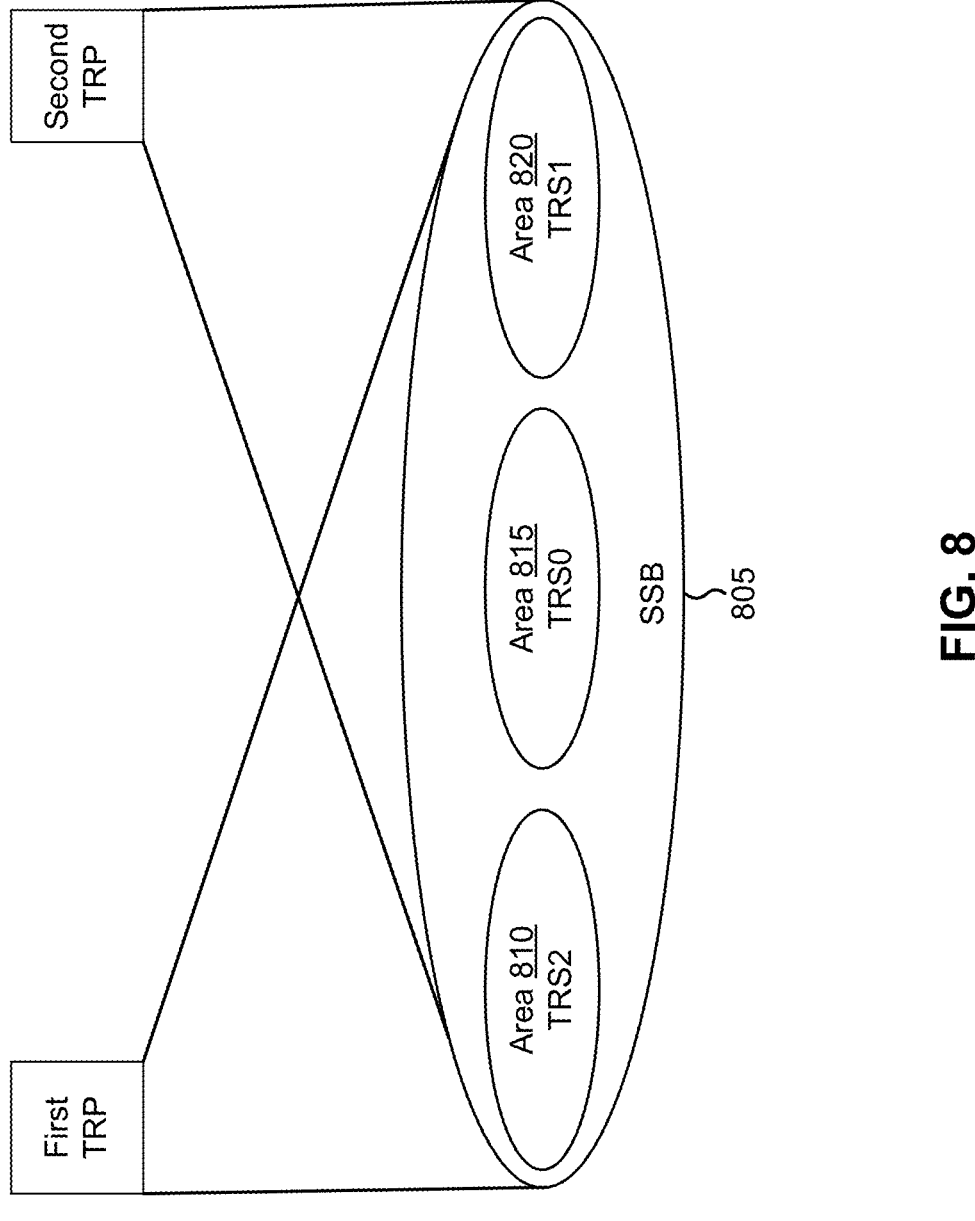
FIG. 8 is a diagram illustrating an example of inter-satellite multiple TRP communication, such as for a non-terrestrial network (NTN), in accordance with the present disclosure.

FIG. 8 is a diagram illustrating an example 800 of inter-satellite multiple TRP communication, such as for an NTN, in accordance with the present disclosure. An NTN is a network in which at least some base station functionality is performed by a non-terrestrial base station, such as a TRP located at a satellite. Example 800 includes a first TRP (e.g., BS 110, RU 340, DU 330, TRP 535, TRP 605, TRP 705) and a second TRP (e.g., BS 110, RU 340, DU 330, TRP 535, TRP 605, TRP 705). In some aspects, the first TRP and the second TRP may be located at different satellites.

As shown, the first TRP and the second TRP may both cover an area 805. For example, the first TRP may transmit downlink communications to UEs located in the area 805, and the second TRP may transmit downlink communications to UEs located in the area 805. In some aspects, the first TRP and the second TRP may transmit the downlink communications covering area 805 (or area 810, 815, or 820, described below) in a same component carrier (CC) (e.g., cell), which improves capacity and/or provides transmit diversity gain. In some aspects, the downlink communications covering the area 805 may include at least an SSB, such that UEs can synchronize with the first TRP and/or the second TRP within the area 805.

As further shown, the first TRP and/or the second TRP may cover areas 810, 815, and 820. For example, the first TRP or the second TRP may transmit communications to UEs located in one or more of the areas 810, 815, and/or 820. In some aspects, a TRP may transmit a communication to a UE in one of area 810, 815, or 820 using a sub-beam of a beam used to transmit in area 805. In some aspects, the downlink communications covering an area (e.g., area 810, area 815, or area 820) may include at least a TRS such that UEs can synchronize with the first TRP and/or the second TRP within the area. A TRS may include a CSI-RS with a configuration that indicates that the CSI-RS is for time and/or frequency tracking. In some aspects, the downlink communications covering an area (e.g., area 810, area 815, or area 820) may include at least a radio resource management (RRM) measurement reference signal. An RRM measurement reference signal may include a signal usable for RRM measurement. As shown, the area 810 may be associated with a first TRS (or RRM measurement reference signal), the area 815 may be associated with a second TRS (or RRM measurement reference signal), and the area 820 may be associated with a third TRS (or RRM measurement reference signal). Thus, a UE can synchronize with a TRP using an SSB or a TRS within the area 805.

A UE may experience a different time of arrival of communications when synchronizing and communicating with a first TRP than when synchronizing and communicating with a second TRP. Additionally, or alternatively, a UE may experience a different received frequency of communications when synchronizing and communicating with a first TRP than when synchronizing with a second TRP. These differences may be due to different Doppler shifts (arising from different velocities of the first TRP and the second TRP relative to the UE), different distances between the UE and the first TRP versus the UE and the second TRP (arising from different locations of the first TRP and the second TRP), or a combination thereof. These differences may be exacerbated at the edge of area 805. The differences in Doppler shift and/or distance may lead to interference between transmissions of the first TRP and the second TRP and violation of maximum time difference (such as maximum receive time difference and/or maximum transmit time difference) limitations between the first TRP and the second TRP.

Some techniques described herein provide timing pre-compensation and/or frequency pre-compensation (e.g., quasi co-location indication) for multiple TRPs, such as in an inter-satellite downlink multiple TRP deployment for an NTN. For example, some techniques described herein provide pre-compensation for a second TRP relative to a first TRP, such that a maximum time difference between transmissions of the first TRP and transmissions of the second TRP is within the length of a cyclic prefix. Thus, differences in Doppler shift and/or distance may be mitigated, leading to decreased interference, improved communication performance, and a larger usable coverage area than if pre-compensation is not applied. Furthermore, some techniques described herein provide indication of TCI states for DMRSs of downlink transmissions of different TRPs, such that timing pre-compensation, frequency pre-compensation, or a combination thereof can be indicated for SSB transmissions, TRS transmissions, and/or other transmissions (e.g., DMRS, PDCCH, PDSCH) of the first TRP and the second TRP.

The techniques described herein may be particularly beneficial for deployments having a large beam size, and which have a time difference (between multiple TRPs) larger than a cyclic prefix and smaller than twice a maximum time difference of a frequency range of the multiple TRPs.

As indicated above, FIG. 8 is provided as an example. Other examples may differ from what is described with regard to FIG. 8.

Figure 9:
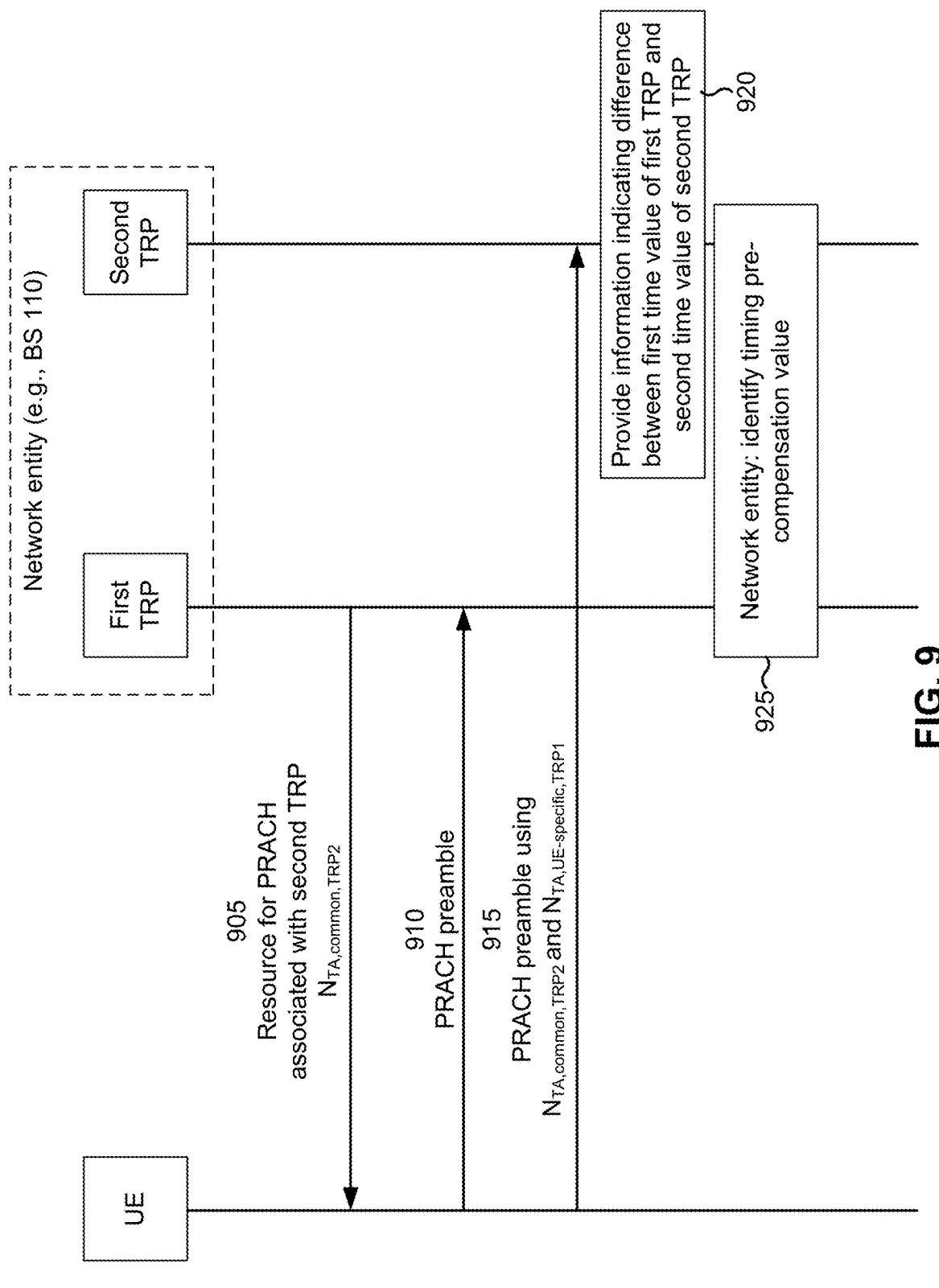
FIG. 9 is a diagram illustrating an example of determining a timing pre-compensation value, in accordance with the present disclosure.

FIG. 9 is a diagram illustrating an example 900 of determining a timing pre-compensation value, in accordance with the present disclosure. Example 900 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). The network entity may cause the first TRP or the second TRP to transmit signaling. In the description of FIGS. 9-14, "causing" a TRP to transmit a communication may include providing the communication for transmission by the TRP, scheduling the TRP to transmit the communication, configuring the TRP to transmit the communication, controlling the TRP such that the communication is transmitted, or the like. In the description of FIGS. 9-14, a reference to a TRP transmitting a communication also discloses the network entity causing the TRP to transmit the communication. Example 900 also includes a UE (e.g., UE 120), which may be in an area covered by the first TRP and the second TRP. In example 900, the network entity identifies a timing pre-compensation value for the second TRP by measuring a propagation delay of an uplink PRACH transmission per TRP.

A timing pre-compensation value is a value identifying a time offset. The time offset may be applied by a second TRP relative to a timing of a first TRP. For example, if the first TRP is to transmit a first signal in accordance with a first time value X (which may, for example, include an average delay indicated by a QCL parameter), and if a second TRP's timing pre-compensation value is Y for a second signal to be transmitted concurrently with the first signal, the second TRP may transmit the second signal at a time X+Y.

As shown by reference number 905, the network entity may cause the first TRP to transmit information indicating a resource for a second PRACH transmission associated with the second TRP. For example, the second PRACH transmission may be transmitted to the second TRP by the UE. The first TRP may further transmit information indicating a common timing advance for the second TRP (e.g., $N_{TA,common,TRP2}$). The common timing advance for the second TRP may indicate a timing advance of the second TRP relative to a reference time that applies for all UEs covered by the second TRP (e.g., covered by a cell to which the common timing advance for the second TRP applies). In some aspects, the network entity or the first TRP may provide information indicating the resource for the first PRACH transmission to the first TRP and common timing advance of the first TRP.

As shown by reference number 910, the UE may transmit a PRACH preamble (e.g., the first PRACH transmission) to the first TRP. The first TRP or the network entity may identify a UE-specific timing advance for the first TRP (e.g., $N_{TA,VE-specific,TRP1}$), which indicates a timing advance, specific to the UE, for the first TRP. For example, the first TRP or the network entity may identify the UE-specific timing advance for the first TRP relative to a common timing advance for the first TRP (e.g., $N_{TA,common,TRP1}$) by identifying a difference between an expected arrival time of the PRACH preamble as determined using the common timing advance for the first TRP, and an observed arrival time of the PRACH preamble. In some other aspects, the UE may receive the information indicating a UE-specific timing advance for the first TRP from another source, or may determine the information indicating the UE-specific timing advance for the first TRP.

As shown by reference number 915, the UE may transmit a PRACH preamble (e.g., the second PRACH transmission) to the second TRP. For example, the UE may transmit the PRACH preamble using both the common timing advance for the second TRP (e.g., a cell-specific common timing advance) and the UE-specific timing advance for the first TRP. By transmitting the PRACH preamble to the second TRP using the common timing advance for the second TRP and the UE-specific timing advance for the first TRP, the UE enables the second TRP or the network entity to measure a differential propagation delay between the first TRP and the second TRP. For example, by comparing an arrival time of the PRACH preamble (relative to the resource for the second PRACH transmission) to the UE-specific timing advance for the first TRP (which provides precise timing adjustment for the UE relative to the first TRP) and the common timing advance for the second TRP (which provides rough time adjustment for all UEs covered by the second TRP), the second TRP can isolate a propagation delay specific to the second TRP and the UE. Thus, the network entity (or the second TRP) can identify a UE-specific timing advance for the second TRP (e.g., $N_{TA,UE-specific,TRP2}$), and may use the UE-specific timing advance for the second TRP as a timing pre-compensation value (or may derive a timing pre-compensation value from the UE-specific timing advance and/or other values). Whether and/or how the second TRP carries out the timing pre-compensation may be coordinated by a gateway connected to both the first TRP and second TRP.

As shown by reference number 920, the second TRP may provide or identify information indicating a difference between a first time value of the first TRP and a second time value of the second TRP. The first time value may include a value used to determine timing of a downlink transmission of the first TRP, such as a timing advance (e.g., $N_{TA,UE-specific, TRP1}$), a delay spread value, or an average delay. The second time value may include a value used to determine timing of a downlink transmission of the second TRP, such as a timing advance (e.g., $N_{TA,UE-specific, TRP1}$), an average delay, a delay spread value, or a differential propagation delay. The difference may indicate a difference in arrival time, at the UE, of a communication transmitted by the second TRP relative to a communication transmitted by the first TRP.

As shown by reference number 925, the network entity may identify a timing pre-compensation value. For example, the network entity may configure the timing pre-compensation value to reduce a maximum timing difference (e.g., a maximum transmission timing difference or a maximum receive time difference) between communications of the first TRP and communications of the second TRP (as observed by the UE) to be shorter than a threshold. The threshold may be defined relative to the length of a cyclic prefix of the UE (e.g., a length of a cyclic prefix of the communications of the first TRP or the communications of the second TRP). For example, the threshold may be, at most, the length of the cyclic prefix. Thus, the network entity can identify a timing pre-compensation value that ensures that communications transmitted by the first TRP and communications transmitted by the second TRP are separated by, at most, the length of the cyclic prefix.

As indicated above, FIG. 9 is provided as an example. Other examples may differ from what is described with regard to FIG. 9.

Figure 10:
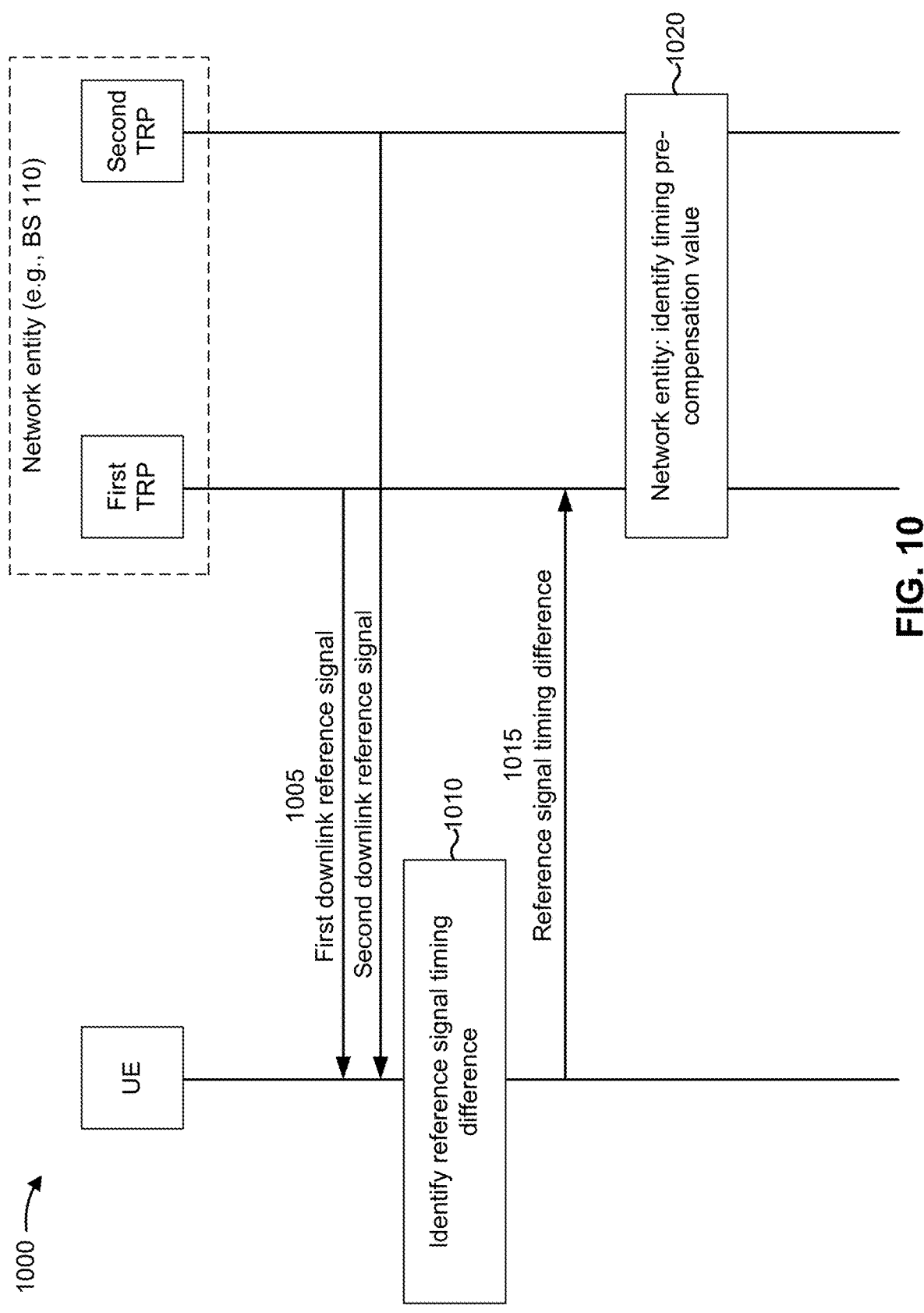
FIG. 10 is a diagram illustrating an example of determining a timing pre-compensation value, in accordance with the present disclosure.

FIG. 10 is a diagram illustrating an example 1000 of determining a timing pre-compensation value, in accordance with the present disclosure. Example 1000 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). The network entity may cause the first TRP or the second TRP to transmit signaling. As used herein, "causing" a TRP to transmit a communication may include providing the communication for transmission by the TRP, scheduling the TRP to transmit the communication, configuring the TRP to transmit the communication, controlling the TRP such that the communication is transmitted, or the like. Example 1000 also includes a UE (e.g., UE 120), which may be in an area covered by the first TRP and the second TRP. In example 1000, the network entity identifies a timing pre-compensation value for the second TRP based at least in part on a differential propagation delay (such as a reference signal timing difference) at the UE per TRP. The reference signal timing difference may be a UE-specific time difference of two RSs from TRP1 and TRP2 with common transmitter reference timing, which is based on propagation delay, and which equal to half of a timing adjustment difference ($N_{TA\_common}+N_{TA\_UE-specific}$) of the first TRP and the second TRP.

As shown by reference number 1005, the network entity may cause the first TRP to transmit a first downlink reference signal, and may cause the second TRP to transmit a second downlink reference signal. The network entity may cause the first TRP and the second TRP to transmit the respective reference signals concurrently. The first downlink reference signal may include, for example, an SSB, a TRS, or another form of reference signal. The second downlink reference signal may include, for example, an SSB, a TRS, or another form of reference signal. In some aspects, the network entity may cause only the second TRP to transmit the second downlink reference signal (e.g., may not cause the first TRP to transmit a first downlink reference signal concurrently with the second downlink reference signal).

As shown by reference number 1010, the UE may identify a reference signal timing difference between the first downlink reference signal and the second downlink reference signal. The reference signal timing difference may indicate a difference (e.g., t2-t1) in an arrival time of the first downlink reference signal (t1) and the second downlink reference signal (t2). As shown by reference number 1015, the UE may transmit information indicating the reference signal timing difference to the network entity (e.g., via the first TRP or the second TRP). For example, the UE may transmit the information to a serving cell (e.g., the first TRP).

As shown by reference number 1020, the network entity may identify a timing pre-compensation value based at least in part on the reference signal timing difference. For example, the network entity may configure the timing pre-compensation value to reduce a maximum timing difference (e.g., a maximum transmission timing difference or a maximum receive time difference) between communications of the first TRP and communications of the second TRP (as indicated by the reference signal timing difference) to be shorter than a threshold. The threshold may be defined relative to the length of a cyclic prefix of the UE (e.g., a length of a cyclic prefix of the communications of the first TRP or the communications of the second TRP). For example, the threshold may be, at most, the length of the cyclic prefix. In some aspects, the timing pre-compensation value may be determined to be equal to (or to perfectly offset) the reference signal timing difference, such that transmissions of the first TRP and the second TRP arrive at a same time. For example, the first TRP may provide the reference signal timing difference (or, more generally, information indicating the timing pre-compensation value) to the second TRP via a gateway, and the second TRP may apply timing pre-compensation for the UE. In this example, if the reference signal timing difference is X, the timing pre-compensation value may be –X. Thus, the network entity can identify a timing pre-compensation value that ensures that communications transmitted by the first TRP and communications transmitted by the second TRP are separated by, at most, the length of the cyclic prefix. In some aspects, the network entity may further configure the second TRP to perform frequency pre-compensation, as described below.

As indicated above, FIG. 10 is provided as an example. Other examples may differ from what is described with regard to FIG. 10.

Figure 11:
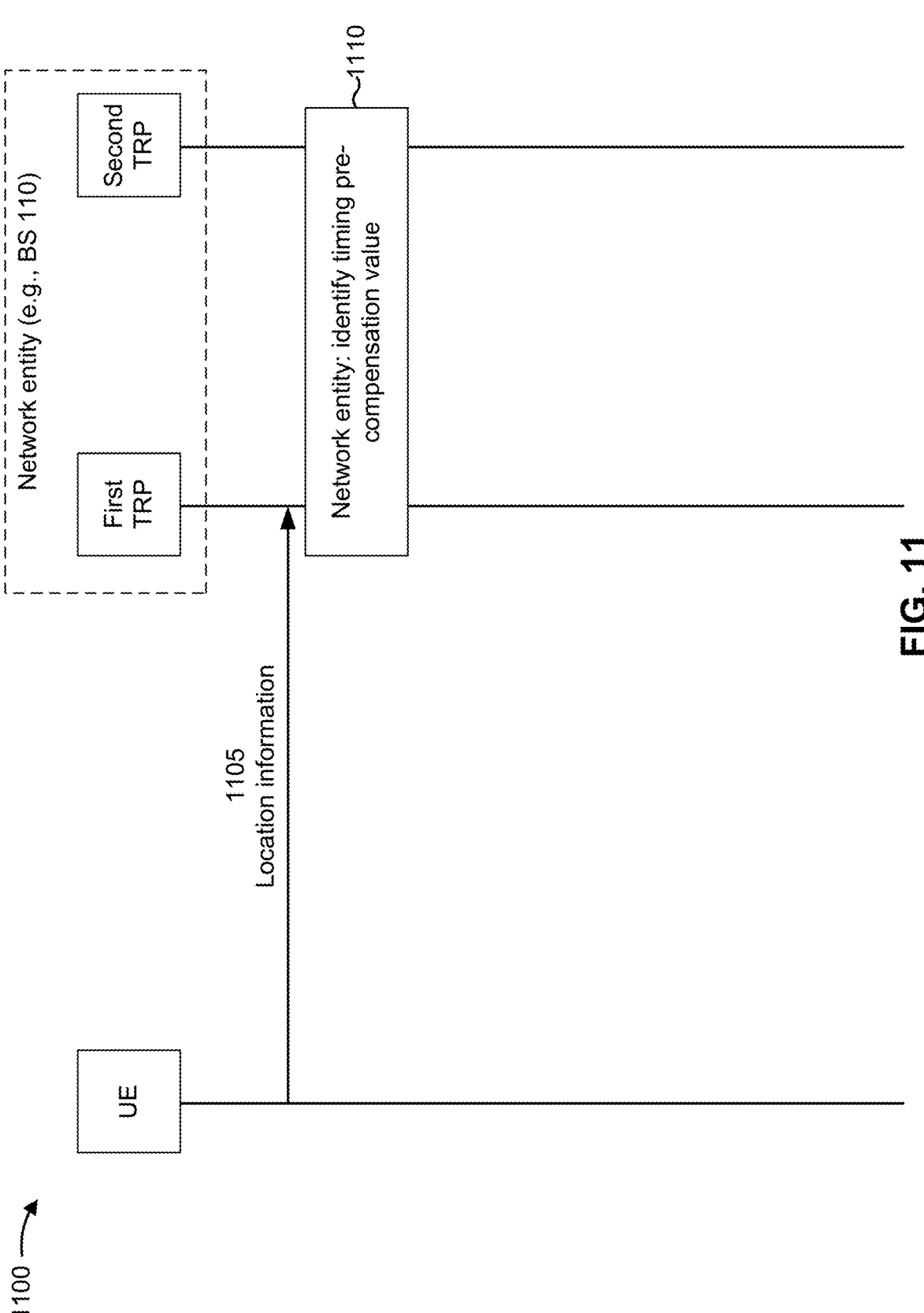
FIG. 11 is a diagram illustrating an example of determining a timing pre-compensation value, in accordance with the present disclosure.

FIG. 11 is a diagram illustrating an example 1100 of determining a timing pre-compensation value, in accordance with the present disclosure. Example 1100 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). Example 1100 also includes a UE (e.g., UE 120), which may be in an area covered by the first TRP and the second TRP. In example 1100, the network entity identifies a timing pre-compensation value for the second TRP based at least in part on a location of the UE.

As shown by reference number 1105, the UE may transmit location information. The network entity may receive the location information. The location information may include, for example, a GPS based location, an accurate position/location of the UE (where the accuracy granularity of the UE position/location reporting may be predefined or configured by the network, e.g., in terms of a few meters), or the like. In some aspects, the reporting of the location information may be based at least in part on a UE capability. For example, the UE may report an accurate position if a capability of the UE indicates that the UE is capable of reporting an accurate position, and may otherwise report a GPS based location. As shown by reference number 1110, the network entity may estimate a timing pre-compensation value, or a difference between time values of the first TRP and the second TRP, based at least in part on the location information. For example, the network entity may identify a timing advance of the first TRP and a timing advance of the second TRP according to geometric relationships between the first TRP and the UE, and between the second TRP and the UE. As another example, the network entity may identify the timing advance of the first TRP and the timing advance of the second TRP based on a geometric relationship between the first TRP and the second TRP. In some aspects, the network entity may configure the timing pre-compensation value to reduce a maximum timing difference (e.g., a maximum transmission timing difference or a maximum receive time difference) between communications of the first TRP and communications of the second TRP (as indicated by the difference derived from the location of the UE) to be shorter than a threshold. The threshold may be defined relative to the length of a cyclic prefix of the UE (e.g., a length of a cyclic prefix of the communications of the first TRP or the communications of the second TRP). For example, the threshold may be, at most, the length of the cyclic prefix. In some aspects, the timing pre-compensation value may be determined to be equal to (or to perfectly offset) the difference, such that transmissions of the first TRP and the second TRP arrive at a same time. Thus, the network entity can identify a timing pre-compensation value that ensures that communications transmitted by the first TRP and communications transmitted by the second TRP are separated by, at most, the length of the cyclic prefix. The network entity may provide information indicating the timing pre-compensation value (and/or a frequency pre-compensation value) to the second TRP.

As indicated above, FIG. 11 is provided as an example. Other examples may differ from what is described with regard to FIG. 11.

FIGS. 9-11 provide examples of how a network entity can identify a timing pre-compensation value for a second TRP relative to a first time value of a first TRP. After the timing pre-compensation value is applied, a maximum receive time difference between transmissions of the first TRP and transmissions of the second TRP (as received by a given UE) may be within a length of a cyclic prefix of the UE. In some aspects, the network entity may also identify a frequency offset value for the second TRP relative to a first frequency value of the first TRP. In some aspects, the second TRP may transmit a reference signal using the timing pre-compensation value and/or the frequency offset value. The UE may perform further timing compensation and/or frequency compensation (which may be referred to as fine compensation) using the reference signal to receive communications from the first TRP and the second TRP, such as a DMRS, a PDCCH, a PDSCH, or a combination thereof. Additionally, or alternatively, the UE or the second TRP may perform time compensation and frequency compensation using an uplink sounding reference signal transmitted by the UE (for example, the second TRP may adjust the timing pre-compensation value and/or the frequency offset value according to a difference between the reception of the uplink sounding reference signal and the transmission of the reference signal).

Figure 12:
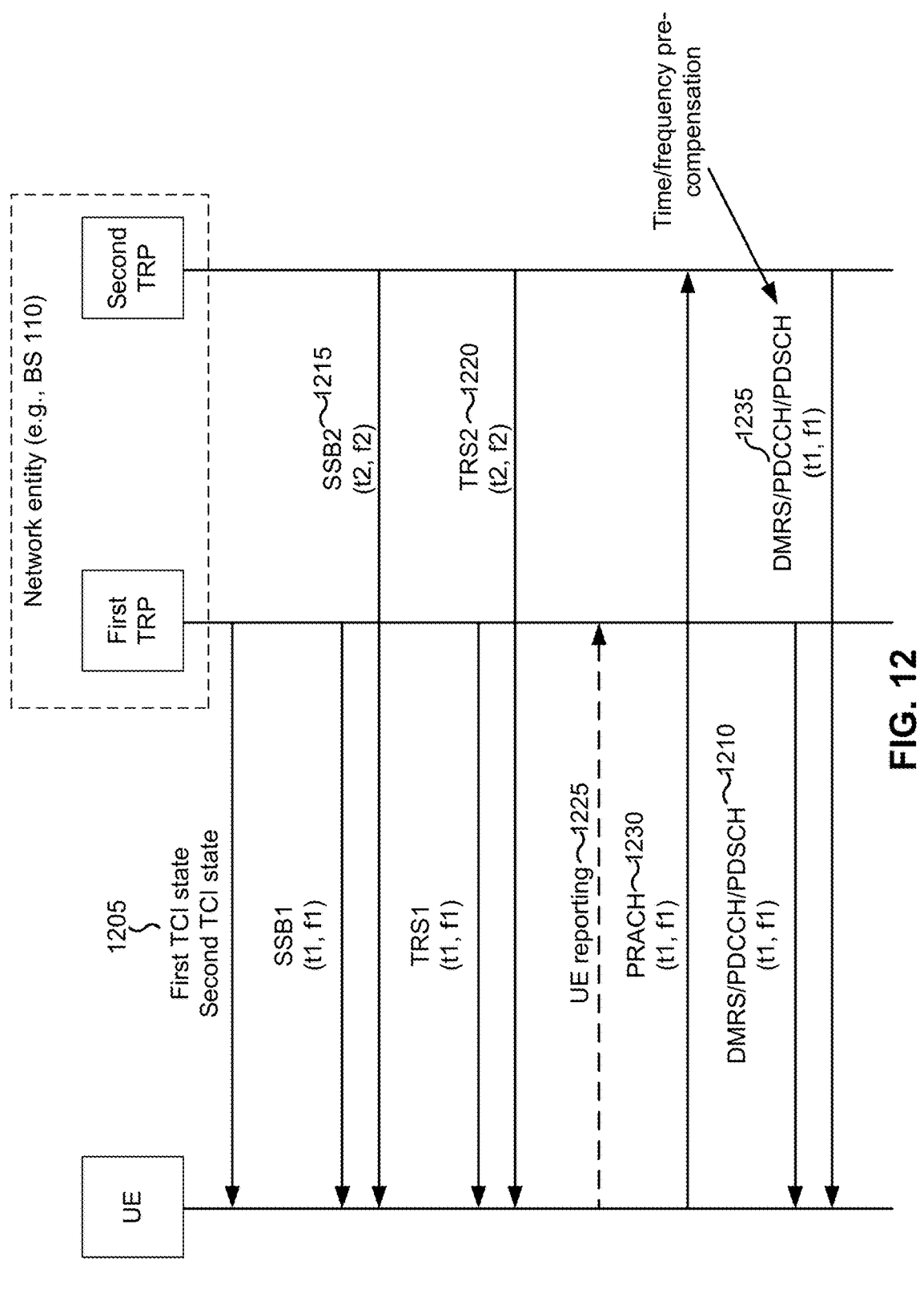
FIG. 12 is a diagram illustrating an example of signaling associated with transmission of a synchronization signal block (SSB) and a tracking reference signal (TRS) without pre-compensation and a communication using pre-compensation, in accordance with the present disclosure.
Figure 13:
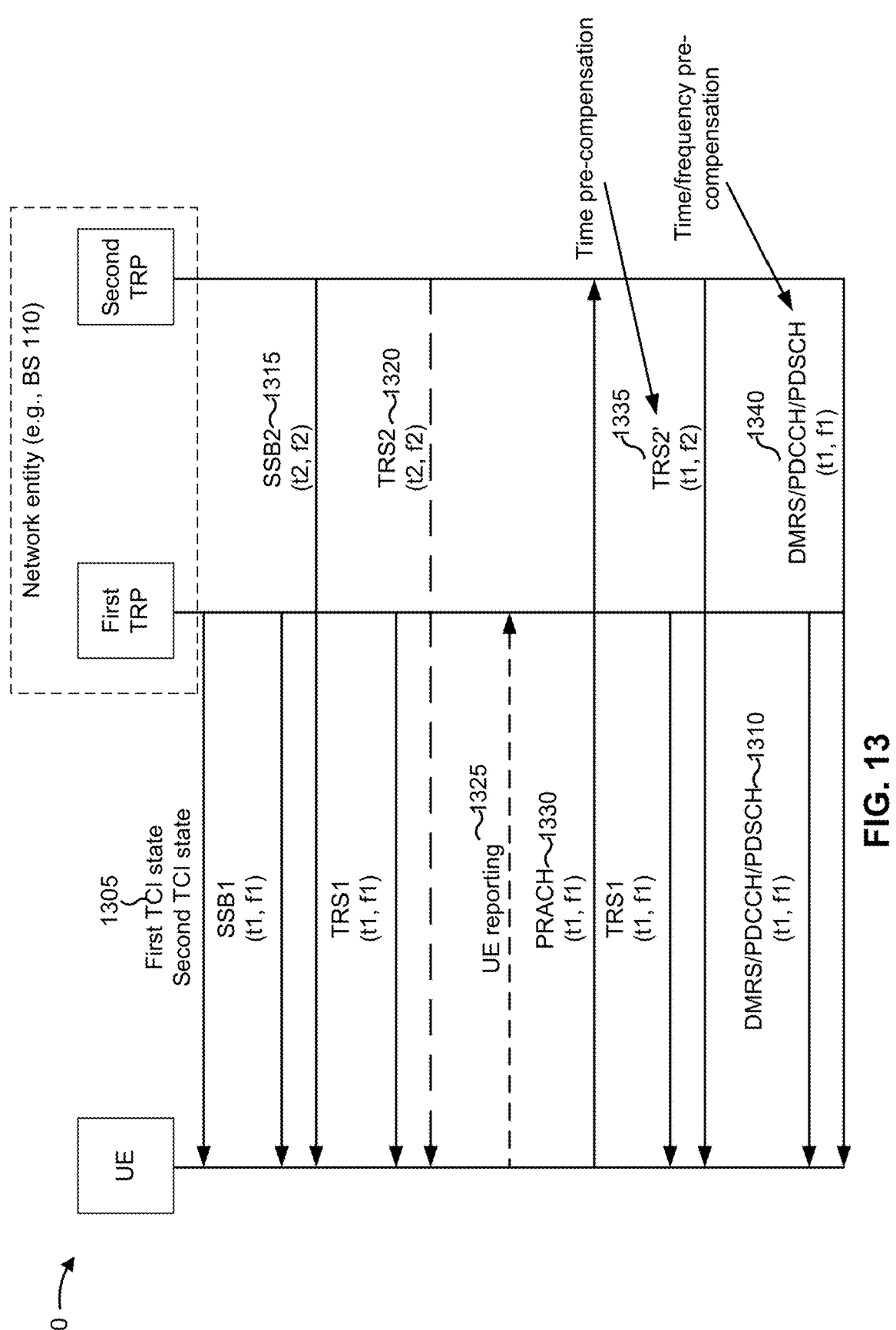
FIG. 13 is a diagram illustrating an example of signaling associated with transmission of an SSB without pre-compensation, a TRS with timing pre-compensation, and a communication using pre-compensation, in accordance with the present disclosure.
Figure 14:
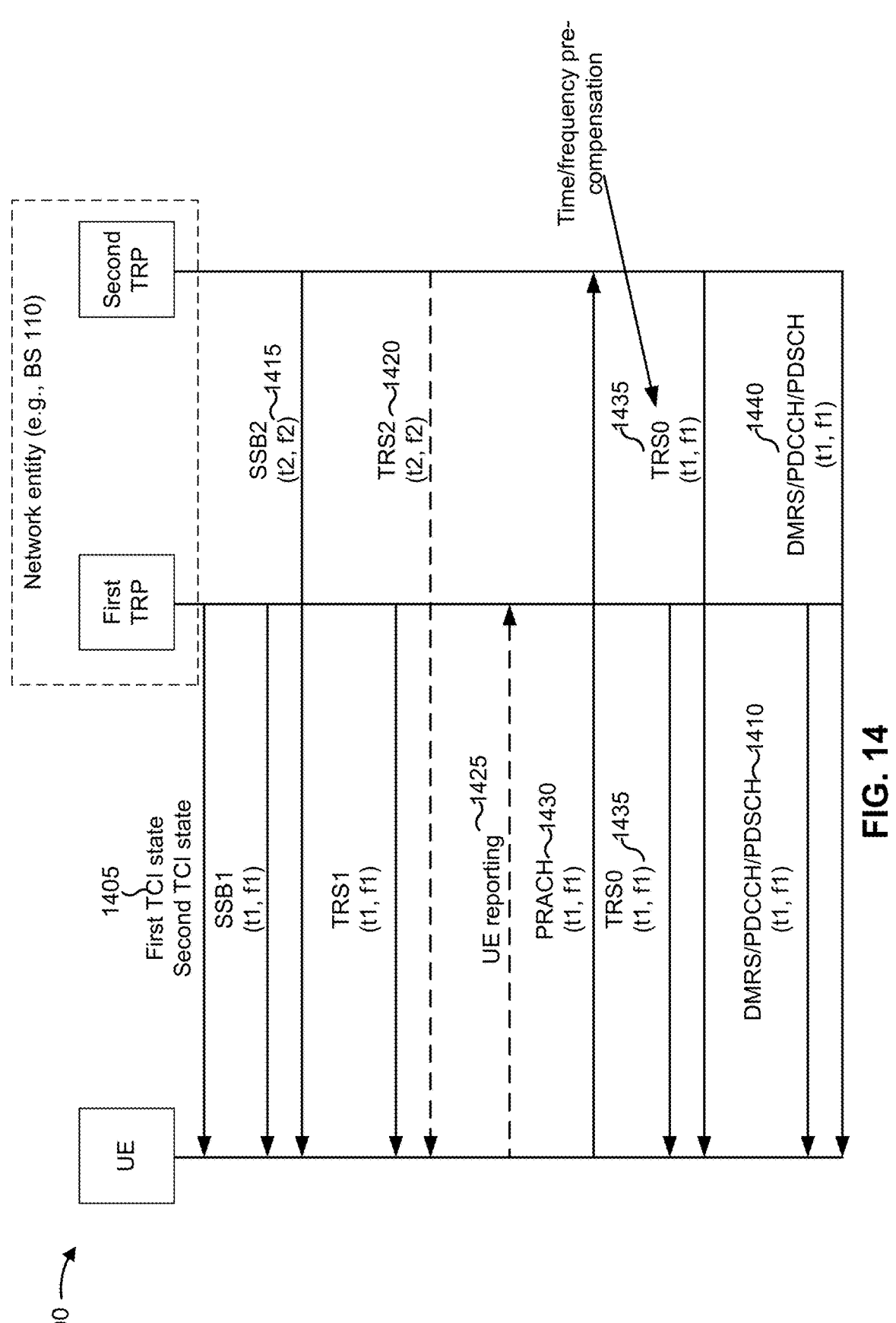
FIG. 14 is a diagram illustrating an example of signaling associated with transmission of an SSB without pre-compensation and a TRS and a communication using pre-compensation, in accordance with the present disclosure.

The communications can use a single-frequency network (SFN) configuration (e.g., using a single layer) or a non-SFN configuration (e.g., in which each TRP transmits a respective set of one or more layers). FIGS. 12-14 provide examples of TCI state configuration for the first TRP and the second TRP for an SFN configuration and taking into account timing pre-compensation.

FIG. 12 is a diagram illustrating an example 1200 of signaling associated with transmission of an SSB and TRS without pre-compensation and a communication using pre-compensation, in accordance with the present disclosure. Example 1200 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). The network entity may cause the first TRP or the second TRP to transmit signaling. As used herein, "causing" a TRP to transmit a communication may include providing the communication for transmission by the TRP, scheduling the TRP to transmit the communication, configuring the TRP to transmit the communication, controlling the TRP such that the communication is transmitted, or the like. Example 1200 also includes a UE (e.g., UE 120), which may be in an area covered by the first TRP and the second TRP.

As shown by reference number 1205, the network entity may cause the first TRP (or the second TRP, or a combination thereof) to transmit a first TCI state and a second TCI state. The first TCI state may include a first set of QCL parameters for the first TRP and a second set of QCL parameters for the second TRP. For example, the first TCI state may indicate a first set of QCL parameters for a first communication (e.g., a PDCCH, a PDSCH, a DMRS, or a combination thereof) of the first TRP. For example, the second TCI state may indicate a second set of QCL parameters for a second communication (e.g., a PDCCH, a PDSCH, a DMRS, or a combination thereof) of the second TRP. In some aspects, the first communication and the second communication may have an SFN configuration. Thus, the network entity may indicate TCI states per TRP for a PDCCH, PDSCH, and/or DMRS.

The first TCI state may indicate QCL-Type A parameters relative to an SSB1 and/or a TRS1, such as an average delay, a delay spread, a Doppler shift, and a Doppler spread. SSB1 and TRS1 may be transmitted in accordance with a first time value such that SSB1 and TRS 1 are received by the UE at a first time t1 and a first frequency f1. It should be noted that times and frequencies referred to using t1 and t2 are generally measured relative to a transmission time of the corresponding signal. For example, even though SSB1 and TRS1 are both noted as arriving at 11, these signals can arrive at different times, where SSB1's value of t1 is relative to a transmission time of SSB1 and TRS1's value of t1 is relative to a transmission time of TRS1. The first time value is defined in connection with FIGS. 9-11. The first frequency value may include a frequency offset or the like. The UE may derive QCL parameters (such as based on t1 and f1) for reception of the first communication (shown by reference number 1210) from the SSB1 and/or the TRS1.

As shown by reference number 1215, the second TRP may transmit an SSB2 without timing pre-compensation or frequency pre-compensation. As shown by reference number 1220, the second TRP may transmit a TRS2 without timing pre-compensation or frequency pre-compensation. As further shown, the TRS2 and the SSB2 may arrive at the UE at a time t2 and a frequency f2. Thus, there is a time difference (t1 minus t2) and a frequency difference (f1 minus f2) between communications of the first TRP and communications of the second TRP.

In some aspects, as shown by reference number 1225, the UE may optionally transmit reporting. The reporting may indicate, for example, a reference signal timing difference or a location of the UE, as described with regard to FIGS. 9-11. As shown by reference number 1230, in some aspects, the UE may transmit a PRACH preamble to the second TRP, as described in connection with FIG. 12. Thus, the network entity can identify a timing pre-compensation value and/or a frequency offset value using the reporting or the PRACH preamble, as described above.

As shown by reference number 1210, the first TRP may transmit a first communication. The first communication may include, for example, a DMRS, a PDCCH, a PDSCH, or a combination thereof. As shown by reference number 1235, the second TRP may transmit a second communication. The second communication may include, for example, a DMRS, a PDCCH, a PDSCH, or a combination thereof. As shown, the second TRP may transmit the second communication using a timing pre-compensation value and a frequency pre-compensation value, which may be signaled to the second TRP by a network entity. Thus, the first communication and the second communication are both received by the UE at substantially a same time t1 and a same frequency f1. In some aspects, the second TCI state of the second TRP may indicate QCL parameters relative to SSB2 or TRS2. In some aspects, the UE may derive a delay spread from the second TCI state, and may use a remainder of QCL parameters (e.g., average delay, Doppler shift, and Doppler spread) from the first TCI state (e.g., may derive QCL parameters for the remainder of QCL parameters from a source signal of the first TCI state). For example, the UE may ignore the remainder of QCL parameters that are indicated by the second TCI state. The network entity may provide an indication to ignore the remainder of QCL parameters that are indicated by the second TCI state. The network entity may cause the second TRP to transmit the second communication using a first time value (derived from a first TCI state including a set of first QCL parameters of the first TRP), while applying the timing pre-compensation value. The second communication may not use a second time value derived from the second TCI state. For example, the UE may not receive the second communication using the second time value. Thus, the network entity can handle frequency pre-compensation and time pre-compensation for the second communication. In some aspects, the network entity may transmit information indicating a timing pre-compensation value and a frequency offset relative to the TRS2. In such examples, the second TCI state may indicate delay spread, average delay, Doppler shift, and Doppler spread relative to the TRS2 (or the SSB2), and the UE may derive and adjust time values and frequency values for the second TCI state according to the timing pre-compensation value and the frequency offset. The network entity may cause the second TRP to transmit the second communication using a second time value (derived from a second TCI state including a set of second QCL parameters of the second TRP), while applying the timing pre-compensation value. The second communication may not use a first time value derived from the first TCI state. For example, the UE may not receive the second communication using the first time value. Thus, the UE can apply a timing pre-compensation value and a frequency offset for the second communication, which reduces burden on the network to align TRP1 and TRP2's transmissions in time and frequency.

As indicated above, FIG. 12 is provided as an example. Other examples may differ from what is described with regard to FIG. 12.

FIG. 13 is a diagram illustrating an example 1300 of signaling associated with transmission of an SSB without pre-compensation, a TRS with timing pre-compensation, and a communication using pre-compensation, in accordance with the present disclosure. Example 1300 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). The network entity may cause the first TRP or the second TRP to transmit signaling. As used herein, "causing" a TRP to transmit a communication may include providing the communication for transmission by the TRP, scheduling the TRP to transmit the communication, configuring the TRP to transmit the communication, controlling the TRP such that the communication is transmitted, or the like. Example 1300 also includes a UE (e.g., UE 130), which may be in an area covered by the first TRP and the second TRP.

As shown by reference number 1305, the network entity may cause the first TRP (or the second TRP, or a combination thereof) to transmit a first TCI state and a second TCI state. The first TCI state may include a first set of QCL parameters for the first TRP and a second set of QCL parameters for the second TRP. For example, the first TCI state may indicate a first set of QCL parameters for a first communication (e.g., a PDCCH, a PDSCH, a DMRS, or a combination thereof) of the first TRP. For example, the second TCI state may indicate a second set of QCL parameters for a second communication (e.g., a PDCCH, a PDSCH, a DMRS, or a combination thereof) of the second TRP. In some aspects, the first communication and the second communication may have an SFN configuration. Thus, the network entity may indicate TCI states per TRP for a PDCCH, PDSCH, and/or DMRS.

The first TCI state may indicate QCL-Type A parameters relative to an SSB1 and/or a TRS1, such as an average delay, a delay spread, a Doppler shift, and a Doppler spread. SSB1 and TRS1 may be transmitted in accordance with a first time value such that SSB1 and TRS 1 are received by the UE at a first time t1 and a first frequency f1. It should be noted that times and frequencies referred to using t1 and t2 are generally measured relative to a transmission time of the corresponding signal. For example, even though SSB1 and TRS1 are both noted as arriving at t1, these signals can arrive at different times, where SSB1's value of t1 is relative to a transmission time of SSB1 and TRS1's value of t1 is relative to a transmission time of TRS1. The first time value is defined in connection with FIGS. 9-11. The first frequency value may include a frequency offset or the like. The UE may derive QCL parameters (such as based on t1 and f1) for reception of the first communication (shown by reference number 1310) from the SSB1 and/or the TRS1.

As shown by reference number 1315, the second TRP may transmit an SSB2 without timing pre-compensation or frequency pre-compensation. As shown by reference number 1320, the second TRP may optionally transmit a TRS2 without timing pre-compensation or frequency pre-compensation. As further shown, the TRS2 and the SSB2 may arrive at the UE at a time t2 and a frequency f2. Thus, there is a time difference and a frequency difference between communications of the first TRP and communications of the second TRP. In some aspects, the first TRP may not transmit TRS1 and/or the second TRP may not transmit TRS2.

In some aspects, as shown by reference number 1325, the UE may transmit reporting. The reporting may indicate, for example, a reference signal timing difference or a location of the UE, as described with regard to FIGS. 9-11. As shown by reference number 1330, in some aspects, the UE may transmit a PRACH preamble to the second TRP, as described in connection with FIG. 13. Thus, the network entity can identify a timing pre-compensation value and/or a frequency offset value using the reporting or the PRACH preamble, as described above.

As shown by reference number 1335, the second TRP may transmit a TRS2'. As further shown, the second TRP may transmit the TRS2' using a timing pre-compensation value, which may be signaled to the second TRP by the network entity. Thus, the TRS2' arrives at the UE in accordance with a time t1 (e.g., of the first TRP, such as the SSB1 or the TRS1). For example, the network entity may indicate the timing pre-compensation value relative to a timing value of the SSB2 or the TRS2. As another example, the UE may identify the timing pre-compensation value (e.g., as t1 minus t2), such as using the timing of SSB1 or a time difference between TRS1 and TRS2. For example, the UE may use the timing of SSB1 or TRS1 to receive the TRS2', and may apply a timing pre-compensation value of (t1 minus t2) to the timing of SSB1 or TRS1.

As shown by reference number 1310, the first TRP may transmit a first communication. The first communication may include, for example, a DMRS, a PDCCH, a PDSCH, or a combination thereof. As shown by reference number 1340, the second TRP may transmit a second communication. The second communication may include, for example, a DMRS, a PDCCH, a PDSCH, or a combination thereof. As shown, the second TRP may transmit the second communication using a timing pre-compensation value and a frequency pre-compensation value. Thus, the first communication and the second communication are both received by the UE at a same time t1 and a same frequency f1. In some aspects, the second TCI state of the second TRP may indicate QCL parameters relative to TRS2'. In some aspects, the UE may derive a delay spread, a Doppler shift, and a Doppler spread from the second TCI state (e.g., from a source signal of the second TCI state), and may ignore an average delay parameter in the second TCI state (e.g., may derive the average delay parameter from a source signal of the first TCI state). In some aspects, the network entity may provide an indication to ignore the average delay parameter. In some aspects, the network entity may transmit information indicating a timing pre-compensation value and a frequency offset relative to the TRS2. For example, the second TCI state may indicate delay spread, average delay, Doppler shift, and Doppler spread relative to the TRS2 (or the SSB2). The network entity may transmit, to the UE, information indicating a timing offset of the second communication relative to TRS2. The UE may use an average delay indicated by the QCL-Type A parameter of the first TRP and may use the information indicating the timing offset of the DMRS relative to TRS2 to transmit the second communication.

As indicated above, FIG. 13 is provided as an example. Other examples may differ from what is described with regard to FIG. 13.

FIG. 14 is a diagram illustrating an example 1400 of signaling associated with transmission of an SSB without pre-compensation and a TRS and a communication using pre-compensation, in accordance with the present disclosure. Example 1400 includes a network entity (e.g., BS 110), a first TRP (e.g., BS 110, RU 340, DU 330, TRP 535, TRP 605, TRP 705), and a second TRP (e.g., BS 110, RU 340, DU 330, TRP 535, TRP 605, TRP 705). The network entity may cause the first TRP or the second TRP to transmit signaling. As used herein, "causing" a TRP to transmit a communication may include providing the communication for transmission by the TRP, scheduling the TRP to transmit the communication, configuring the TRP to transmit the communication, controlling the TRP such that the communication is transmitted, or the like. Example 1400 also includes a UE (e.g., UE 120), which may be in an area covered by the first TRP and the second TRP.

As shown by reference number 1405, the network entity may cause the first TRP (or the second TRP, or a combination thereof) to transmit a first TCI state and a second TCI state. The first TCI state may include a first set of QCL parameters for the first TRP and a second set of QCL parameters for the second TRP. For example, the first TCI state may indicate a first set of QCL parameters for a first communication (e.g., a PDCCH, a PDSCH, a DMRS, or a combination thereof) of the first TRP. For example, the second TCI state may indicate a second set of QCL parameters for a second communication (e.g., a PDCCH, a PDSCH, a DMRS, or a combination thereof) of the second TRP. The first TCI state may indicate that the first communication is quasi co-located with SSB1 or TRS0 (as transmitted by the first TRP). The second TCI state may indicate that the second communication is quasi co-located with SSB2 or TRS0 (as transmitted by the second TRP). In some aspects, the first communication and the second communication may have an SFN configuration. Thus, the network entity may indicate TCI states per TRP for a PDCCH, PDSCH, and/or DMRS.

The first TCI state may indicate QCL-Type A parameters relative to an SSB1 and/or a TRS0, such as an average delay, a delay spread, a Doppler shift, and a Doppler spread. SSB1 and (optionally) TRS1 may be transmitted by the first TRP and may arrive at a time t1 and a frequency f1. The UE may derive QCL parameters for reception of the first communication (shown by reference number 1410) from the SSB1 and/or the TRS0.

As shown by reference number 1415, the second TRP may transmit an SSB2 without timing pre-compensation or frequency pre-compensation. As shown by reference number 1420, the second TRP may optionally transmit a TRS2 without timing pre-compensation or frequency pre-compensation. As further shown, the TRS2 and the SSB2 may arrive at the UE at a time 12 and a frequency f2. Thus, there is a time difference and a frequency difference of arrival between communications of the first TRP and communications of the second TRP. In some aspects, the first TRP may not transmit TRS1 and/or the second TRP may not transmit TRS2.

In some aspects, as shown by reference number 1425, the UE may transmit reporting. The reporting may indicate, for example, a reference signal timing difference or a location of the UE, as described with regard to FIGS. 9-11. As shown by reference number 1430, in some aspects, the UE may transmit a PRACH preamble to the second TRP, as described in connection with FIG. 9. Thus, the network entity can identify a timing pre-compensation value and/or a frequency offset value using the reporting or the PRACH preamble, as described above.

As shown by reference number 1435, the first TRP and the second TRP may transmit a TRS0. TRS0 may be considered a common reference signal or an SFN reference signal. As shown, the second TRP may transmit the TRS0 using a timing pre-compensation value and a frequency pre-compensation value, which may be configured for the second TRP by the network entity. For example, the network entity may indicate (e.g., configure the second TRP to transmit, configure the UE to receive) the TRS0 from the second TRP with a timing pre-compensation value and a frequency pre-compensation value relative to SSB2 or TRS2. As another example, the UE may use a timing value and a frequency offset of the SSB1 (transmitted by the first TRP) to receive TRS0 from the second TRP (which assumes timing pre-compensation and frequency pre-compensation by the second TRP).

As shown by reference number 1410, the first TRP may transmit a first communication. The first communication may include, for example, a DMRS, a PDCCH, a PDSCH, or a combination thereof. As shown by reference number 1440, the second TRP may transmit a second communication. The second communication may include, for example, a DMRS, a PDCCH, a PDSCH, or a combination thereof. Thus, the first communication and the second communication are both received by the UE at a same time t1 and a same frequency f1. In some aspects, the first TCI state of the first TRP and the second TCI state of the second TRP may both indicate QCL parameters relative to TRS0. Thus, by applying both time pre-compensation and a frequency offset for TRS0, the second TRP enables indication of a TCI state for the second communication relative to TRS0.

As indicated above, FIG. 14 is provided as an example. Other examples may differ from what is described with regard to FIG. 14.

FIGS. 12-14 provide examples of how TCI states can be used to indicate timing pre-compensation and frequency offsets such that multi-TRP communications (such as those associated with different satellites) can be adjusted to within acceptable time offsets (such as maximum receive time differences) and frequency offsets. In some aspects, a network entity may indicate a scheme for indicating QCL parameters of a communication (e.g., a DMRS, a PDCCH, or a PDSCH), such as via RRC signaling, MAC signaling, or DCI. For example, the network entity may indicate how a timing pre-compensation value should be derived and/or how a frequency offset should be derived for a second communication by a second TRP (e.g., using one or more of the techniques described with regards to FIGS. 12-14). As another example, the network entity may indicate which QCL parameters of a TCI state for a second TRP are to be ignored. Furthermore, while the description of FIGS. 12-14 is provided with regard to a first TCI state and a second TCI state for two TRPs, these techniques can be applied for any number of TCI states corresponding to any number of TRPs. For example, a UE may transmit information indicating a number of TRPs (or a number of TCI states) supported by the UE, and the network entity may perform the operations of FIGS. 12-14 using at most the number of TRPs or the number of TCI states.

References to TRSs in the description of FIGS. 8-14 also disclose other forms of reference signal transmission, such as RRM measurement reference signals.

FIG. 15 shows a method 1500 for wireless communications by a UE, such as UE 120.

Method 1500 begins at 1510 with receiving a first communication from a first TRP, the first communication being associated with a first time value derived from a first TCI state including a set of first QCL parameters of the first TRP.

Method 1500 then proceeds to step 1520 with receiving a second communication from a second TRP, the second communication being associated with a timing pre-compensation value relative to the first time value.

In a first aspect, the second communication uses the first time value and not a second time value derived from a second TCI state including one or more second QCL parameters of the second TRP.

In a second aspect, alone or in combination with the first aspect, the second communication uses a second time value derived from a second TCI state including one or more second QCL parameters of the second TRP and the timing pre-compensation value relative to the first time value.

In a third aspect, alone or in combination with one or more of the first and second aspects, the first time value comprises an average delay derived from the first set of QCL parameters of the first TRP.

In a fourth aspect, alone or in combination with one or more of the first through third aspects, the first communication uses a first frequency offset value derived from the first TCI state and the second communication uses a frequency pre-compensation value relative to the first frequency offset value.

In a fifth aspect, alone or in combination with one or more of the first through fourth aspects, the first frequency offset value comprises a Doppler shift and a Doppler spread derived from the first set of QCL parameters of the first TRP.

In a sixth aspect, alone or in combination with one or more of the first through fifth aspects, the timing pre-compensation value shifts a transmission time of the second communication to within a maximum timing difference of a transmission time of the first communication.

In a seventh aspect, alone or in combination with one or more of the first through sixth aspects, the maximum timing difference is, at most, a length of a cyclic prefix of the first communication or the second communication.

In an eighth aspect, alone or in combination with one or more of the first through seventh aspects, method 1500 includes transmitting information indicating at least one of the first time value or a difference between the first time value and a second time value of the second TRP, wherein the timing pre-compensation value is based at least in part on the first time value or the difference.

In a ninth aspect, alone or in combination with one or more of the first through eighth aspects, the information indicating the at least one of the first time value or the difference is based at least in part on a first PRACH transmission associated with the first TRP and a second PRACH transmission associated with the second TRP.

In a tenth aspect, alone or in combination with one or more of the first through ninth aspects, the difference comprises a reference signal timing difference, and method 1500 includes deriving the reference signal timing difference from a downlink reference signal.

In an eleventh aspect, alone or in combination with one or more of the first through tenth aspects, method 1500 includes transmitting an indication of a location of the UE, wherein the timing pre-compensation value is based at least in part on the location.

In a twelfth aspect, alone or in combination with one or more of the first through eleventh aspects, the first communication and the second communication correspond to respective layers of a multi-layer transmission.

In a thirteenth aspect, alone or in combination with one or more of the first through twelfth aspects, the first communication and the second communication use a single-frequency network configuration.

In a fourteenth aspect, alone or in combination with one or more of the first through thirteenth aspects, method 1500 includes receiving, from the second TRP, a synchronization signal block or a tracking or RRM measurement reference signal, wherein the timing pre-compensation value is not applied for the synchronization signal block or the tracking reference signal.

In a fifteenth aspect, alone or in combination with one or more of the first through fourteenth aspects, method 1500 includes receiving, from the second TRP, a synchronization signal block, wherein the timing pre-compensation value is not applied for the synchronization signal block, and receiving, from the second TRP, a tracking or RRM measurement reference signal using the timing pre-compensation value, wherein the second communication is associated with the timing pre-compensation value and a frequency pre-compensation value.

In a sixteenth aspect, alone or in combination with one or more of the first through fifteenth aspects, method 1500 includes receiving, from the second TRP, a synchronization signal block, wherein the timing pre-compensation value is not associated with the synchronization signal block, and receiving, from the second TRP, a tracking or RRM measurement reference signal using the timing pre-compensation value, wherein the second communication is associated with the timing pre-compensation value and a frequency pre-compensation value.

In a seventeenth aspect, alone or in combination with one or more of the first through sixteenth aspects, method 1500 includes receiving, from the second TRP, a synchronization signal block, wherein the timing pre-compensation value is not associated with the synchronization signal block, and receiving, from the second TRP, using the timing pre-compensation value and a frequency pre-compensation value, at least one of a tracking or RRM measurement reference signal, a demodulation reference signal, a physical downlink control channel, or a physical downlink shared channel.

In an eighteenth aspect, alone or in combination with one or more of the first through seventeenth aspects, method 1500 includes receiving, from the second TRP, a tracking reference signal using the timing pre-compensation value, wherein the timing pre-compensation value is derived from the tracking reference signal.

In a nineteenth aspect, alone or in combination with one or more of the first through eighteenth aspects, method 1500 includes receiving, from a third TRP, a third communication using another timing pre-compensation value relative to the first time value or relative to the timing pre-compensation value of the second TRP.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

FIG. 16 shows a method 1600 for wireless communications by a network entity, such as BS 110, or a disaggregated base station as discussed with respect to FIG. 3.

Method 1600 begins at 1610 with causing a first TRP to transmit a first communication using a first time value derived from a first TCI state including a set of first QCL parameters of the first TRP.

Method 1600 then proceeds to step 1620 with causing a second TRP to transmit a second communication using a timing pre-compensation value relative to the first time value.

In a first aspect, causing the second TRP to transmit the second communication further comprises causing the second TRP to transmit the second communication using the first time value and not a second time value derived from a second TCI state including one or more second QCL parameters of the second TRP.

In a second aspect, alone or in combination with the first aspect, causing the second TRP to transmit the second communication further comprises causing the second TRP to transmit the second communication using a second time value derived from a second TCI state including one or more second QCL parameters of the second TRP and the timing pre-compensation value relative to the first time value.

In a third aspect, alone or in combination with one or more of the first and second aspects, the first time value comprises an average delay derived from the first set of QCL parameters of the first TRP.

In a fourth aspect, alone or in combination with one or more of the first through third aspects, causing the first TRP to transmit the first communication further comprises causing the first TRP to transmit the first communication using a first frequency offset value derived from the first TCI state, and causing the second TRP to transmit the second communication further comprises causing the second TRP to transmit the second communication using a frequency pre-compensation value relative to the first frequency offset value.

In a fifth aspect, alone or in combination with one or more of the first through fourth aspects, the first frequency offset value comprises a Doppler shift and a Doppler spread derived from the first set of QCL parameters of the first TRP.

In a sixth aspect, alone or in combination with one or more of the first through fifth aspects, the timing pre-compensation value shifts a transmission time of the second communication to within a maximum timing difference of a transmission time of the first communication.

In a seventh aspect, alone or in combination with one or more of the first through sixth aspects, the maximum timing difference is, at most, a length of a cyclic prefix of the first communication or the second communication.

In an eighth aspect, alone or in combination with one or more of the first through seventh aspects, method 1600 includes receiving information indicating at least one of the first time value or a difference between the first time value and a second time value of the second TRP, and identifying the timing pre-compensation value based at least in part on the first time value or the difference.

In a ninth aspect, alone or in combination with one or more of the first through eighth aspects, the information indicating the at least one of the first time value or the difference is based at least in part on a first PRACH transmission associated with the first TRP and a second PRACH transmission associated with the second TRP.

In a tenth aspect, alone or in combination with one or more of the first through ninth aspects, the difference comprises a reference signal timing difference derived from a downlink reference signal.

In an eleventh aspect, alone or in combination with one or more of the first through tenth aspects, the timing pre-compensation value is based at least in part on a location of a user equipment.

In a twelfth aspect, alone or in combination with one or more of the first through eleventh aspects, method 1600 includes causing the second TRP to transmit a reference signal using the timing pre-compensation value.

In a thirteenth aspect, alone or in combination with one or more of the first through twelfth aspects, the first communication and the second communication correspond to respective layers of a multi-layer transmission.

In a fourteenth aspect, alone or in combination with one or more of the first through thirteenth aspects, the first communication and the second communication use a single-frequency network configuration.

In a fifteenth aspect, alone or in combination with one or more of the first through fourteenth aspects, method 1600 includes causing the second TRP to transmit a synchronization signal block or a tracking or RRM measurement reference signal, wherein the timing pre-compensation value is not applied for the synchronization signal block or the tracking or RRM measurement reference signal.

In a sixteenth aspect, alone or in combination with one or more of the first through fifteenth aspects, method 1600 includes causing the second TRP to transmit a synchronization signal block, wherein the timing pre-compensation value is not applied for the synchronization signal block, and causing the second TRP to transmit a tracking or RRM measurement reference signal using the timing pre-compensation value, wherein causing the second TRP to transmit the second communication further comprises causing the second TRP to transmit the second communication using the timing pre-compensation value and a frequency pre-compensation value.

In a seventeenth aspect, alone or in combination with one or more of the first through sixteenth aspects, method 1600 includes causing the second TRP to transmit a synchronization signal block, wherein the timing pre-compensation value is not applied for the synchronization signal block, and causing the second TRP to transmit, using the timing pre-compensation value and a frequency pre-compensation value, at least one of a tracking or RRM measurement reference signal, a demodulation reference signal, a physical downlink control channel, or a physical downlink shared channel.

In an eighteenth aspect, alone or in combination with one or more of the first through seventeenth aspects, method 1600 includes causing the second TRP to transmit a tracking or RRM measurement reference signal using an initial timing pre-compensation value, wherein the timing pre-compensation value is derived from the tracking or RRM measurement reference signal or the initial timing pre-compensation value.

In a nineteenth aspect, alone or in combination with one or more of the first through eighteenth aspects, method 1600 includes causing a third TRP to transmit a third communication using another timing pre-compensation value relative to the first time value or relative to the timing pre-compensation value of the second TRP.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

FIG. 17 is a diagram illustrating an example of an implementation of code and circuitry for a communications device 1700, in accordance with the present disclosure. The communications device 1700 may be a network entity (such as BS 110 or a disaggregated base station as described with regard to FIG. 3), or a network entity may include the communications device 1700.

The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700. The network interface 1712 is configured to obtain and send signals for the communications device 1700 via communications link(s), such as a backhaul link, midhaul link, and/or fronthaul link as described herein, such as with respect to FIG. 3.

The processing system 1702 includes one or more processors 1720. In various aspects, the one or more processors 1720 may be representative of one or more of receive processor 238, transmit processor 220, TX MIMO processor 230, and/or controller/processor 240, as described with respect to FIG. 2. The one or more processors 1720 are coupled to a computer-readable medium/memory 1730 via a bus 1706. In various aspects, the computer-readable medium/memory 1730 may be representative of memory 242, as described with respect to FIG. 2. In certain aspects, the computer-readable medium/memory 1730 is configured to store instructions (e.g., computer-executable code, processor-executable code) that when executed by the one or more processors 1720, cause the one or more processors 1720 to perform the method 1500 described with respect to FIG. 15, or any aspect related to it. Note that reference to a processor performing a function of communications device 1700 may include one or more processors performing that function of communications device 1700.

As shown in FIG. 17, the communications device 1700 may include circuitry for causing a first TRP to transmit a first communication using a first time value derived from a first TCI state including a set of first QCL parameters of the first TRP (circuitry 1735).

As shown in FIG. 17, the communications device 1700 may include, stored in computer-readable medium/memory 1730, code for causing a first TRP to transmit a first communication using a first time value derived from a first TCI state including a set of first QCL parameters of the first TRP (code 1740).

As shown in FIG. 17, the communications device 1700 may include circuitry for causing a second TRP to transmit a second communication using a timing pre-compensation value relative to the first time value (circuitry 1745).

As shown in FIG. 17, the communications device 1700 may include, stored in computer-readable medium/memory 1730, code for causing a second TRP to transmit a second communication using a timing pre-compensation value relative to the first time value (code 1750).

Various components of the communications device 1700 may provide means for performing the method 1500 described with respect to FIG. 15, or any aspect related to it. For example, means for transmitting, sending, or outputting for transmission may include the transceiver(s) 232 and/or antenna(s) 234 of the BS 110 and/or transceiver 1708 and antenna 1710 of the communications device 1700 in FIG. 17. Means for receiving or obtaining may include the transceiver(s) 232 and/or antenna(s) 234 of the BS 110 and/or transceiver 1708 and antenna 1710 of the communications device 1700 in FIG. 17.

FIG. 17 is provided as an example. Other examples may differ from what is described in connection with FIG. 17.

FIG. 18 is a diagram illustrating an example of an implementation of code and circuitry for a communications device 1800, in accordance with the present disclosure. The communications device 1800 may be a UE (e.g., UE 120), or a UE may include the communications device 1800.

The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes one or more processors 1820. In various aspects, the one or more processors 1820 may be representative of one or more of receive processor 258, transmit processor 264, TX MIMO processor 266, and/or controller/processor 280, as described with respect to FIG. 2. The one or more processors 1820 are coupled to a computer-readable medium/memory 1830 via a bus 1806. In various aspects, the computer-readable medium/memory 1830 may be representative of memory 282, as described with respect to FIG. 2. In certain aspects, the computer-readable medium/memory 1830 is configured to store instructions (e.g., computer-executable code, processor-executable code) that when executed by the one or more processors 1820, cause the one or more processors 1820 to perform the method 1600 described with respect to FIG. 16, or any aspect related to it. Note that reference to a processor performing a function of communications device 1800 may include one or more processors performing that function of communications device 1800.

As shown in FIG. 18, the communications device 1800 may include circuitry for receiving a first communication from a first TRP, the first communication being associated with a first time value derived from a first TCI state including a set of first QCL parameter of the first TRP (circuitry 1835).

As shown in FIG. 18, the communications device 1800 may include, stored in computer-readable medium/memory 1830, code for receiving a first communication from a first TRP, the first communication being associated with a first time value derived from a first TCI state including a set of first QCL parameter of the first TRP (code 1840).

As shown in FIG. 18, the communications device 1800 may include circuitry for receiving a second communication from a second TRP, the second communication being associated with a timing pre-compensation value relative to the first time value (circuitry 1845).

As shown in FIG. 18, the communications device 1800 may include, stored in computer-readable medium/memory 1830, code for receiving a second communication from a second TRP, the second communication being associated with a timing pre-compensation value relative to the first time value (code 1850).

Various components of the communications device 1800 may provide means for performing the method 1600 described with respect to FIG. 16, or any aspect related to it. For example, means for transmitting, sending, or outputting for transmission may include the transceiver(s) 254 and/or antenna(s) 252 of the UE 120 and/or transceiver 1808 and antenna 1810 of the communications device 1800 in FIG. 18. Means for receiving or obtaining may include the transceiver(s) 254 and/or antenna(s) 252 of the UE 120 and/or transceiver 1808 and antenna 1810 of the communications device 1800 in FIG. 18.

FIG. 18 is provided as an example. Other examples may differ from what is described in connection with FIG. 18.

The following provides an overview of some Aspects of the present disclosure:

Aspect 1: A method of wireless communication performed by a network entity, comprising: causing a first transmission reception point (TRP) to transmit a first communication using a first time value derived from a first transmission configuration indicator (TCI) state including a set of first quasi co-location (QCL) parameters of the first TRP; and causing a second TRP to transmit a second communication using a timing pre-compensation value relative to the first time value.

Aspect 2: The method of Aspect 1, wherein causing the second TRP to transmit the second communication further comprises causing the second TRP to transmit the second communication using the first time value and not a second time value derived from a second TCI state including one or more second QCL parameters of the second TRP.

Aspect 3: The method of any of Aspects 1-2, wherein causing the second TRP to transmit the second communication further comprises causing the second TRP to transmit the second communication using a second time value derived from a second TCI state including one or more second QCL parameters of the second TRP and the timing pre-compensation value relative to the first time value.

Aspect 4: The method of any of Aspects 1-3, wherein the first time value comprises an average delay derived from the first set of QCL parameters of the first TRP.

Aspect 5: The method of any of Aspects 1-4, wherein causing the first TRP to transmit the first communication further comprises causing the first TRP to transmit the first communication using a first frequency offset value derived from the first TCI state; and wherein causing the second TRP to transmit the second communication further comprises causing the second TRP to transmit the second communication using a frequency pre-compensation value relative to the first frequency offset value.

Aspect 6: The method of Aspect 5, wherein the first frequency offset value comprises a Doppler shift and a Doppler spread derived from the first set of QCL parameters of the first TRP.

Aspect 7: The method of any of Aspects 1-6, wherein the timing pre-compensation value shifts a transmission time of the second communication to within a maximum timing difference of a transmission time of the first communication.

Aspect 8: The method of Aspect 7, wherein the maximum timing difference is, at most, a length of a cyclic prefix of the first communication or the second communication.

Aspect 9: The method of any of Aspects 1-8, further comprising: receiving information indicating at least one of the first time value or a difference between the first time value and a second time value of the second TRP; and identifying the timing pre-compensation value based at least in part on the first time value or the difference.

Aspect 10: The method of Aspect 9, wherein the information indicating the at least one of the first time value or the difference is based at least in part on a first physical random access channel (PRACH) transmission associated with the first TRP and a second PRACH transmission associated with the second TRP.

Aspect 11: The method of Aspect 9, wherein the difference comprises a reference signal timing difference derived from a downlink reference signal.

Aspect 12: The method of any of Aspects 1-11, wherein the timing pre-compensation value is based at least in part on a location of a user equipment.

Aspect 13: The method of any of Aspects 1-12, further comprising causing the second TRP to transmit a reference signal using the timing pre-compensation value.

Aspect 14: The method of any of Aspects 1-13, wherein the first communication and the second communication correspond to respective layers of a multi-layer transmission.

Aspect 15: The method of any of Aspects 1-14, wherein the first communication and the second communication use a single-frequency network configuration.

Aspect 16: The method of any of Aspects 1-15, further comprising causing the second TRP to transmit a synchronization signal block or a tracking or radio resource management (RRM) measurement reference signal, wherein the timing pre-compensation value is not applied for the synchronization signal block or the tracking or RRM measurement reference signal.

Aspect 17: The method of any of Aspects 1-16, further comprising: causing the second TRP to transmit a synchronization signal block, wherein the timing pre-compensation value is not applied for the synchronization signal block; and causing the second TRP to transmit a tracking or RRM measurement reference signal using the timing pre-compensation value, wherein causing the second TRP to transmit the second communication further comprises causing the second TRP to transmit the second communication using the timing pre-compensation value and a frequency pre-compensation value.

Aspect 18: The method of any of Aspects 1-17, further comprising: causing the second TRP to transmit a synchronization signal block, wherein the timing pre-compensation value is not applied for the synchronization signal block; and causing the second TRP to transmit, using the timing pre-compensation value and a frequency pre-compensation value, at least one of a tracking or RRM measurement reference signal, a demodulation reference signal, a physical downlink control channel, or a physical downlink shared channel.

Aspect 19: The method of any of Aspects 1-18, further comprising causing the second TRP to transmit a tracking or RRM measurement reference signal using an initial timing pre-compensation value, wherein the timing pre-compensation value is derived from the tracking or RRM measurement reference signal or the initial timing pre-compensation value.

Aspect 20: The method of any of Aspects 1-19, further comprising causing a third TRP to transmit a third communication using another timing pre-compensation value relative to the first time value or relative to the timing pre-compensation value of the second TRP.

Aspect 21: A method of wireless communication performed by a user equipment (UE), comprising: receiving a first communication from a first transmission reception point (TRP), the first communication being associated with a first time value derived from a first transmission configuration indicator (TCI) state including a set of first quasi co-location (QCL) parameters of the first TRP; and receiving a second communication from a second TRP, the second communication being associated with a timing pre-compensation value relative to the first time value.

Aspect 22: The method of Aspect 21, wherein the second communication uses the first time value and not a second time value derived from a second TCI state including one or more second QCL parameters of the second TRP.

Aspect 23: The method of any of Aspects 21-22, wherein the second communication uses a second time value derived from a second TCI state including one or more second QCL parameters of the second TRP and the timing pre-compensation value relative to the first time value.

Aspect 24: The method of any of Aspects 21-23, wherein the first time value comprises an average delay derived from the first set of QCL parameters of the first TRP.

Aspect 25: The method of any of Aspects 21-24, wherein the first communication uses a first frequency offset value derived from the first TCI state and the second communication uses a frequency pre-compensation value relative to the first frequency offset value.

Aspect 26: The method of Aspect 25, wherein the first frequency offset value comprises a Doppler shift and a Doppler spread derived from the first set of QCL parameters of the first TRP.

Aspect 27: The method of any of Aspects 21-26, wherein the timing pre-compensation value shifts a transmission time of the second communication to within a maximum timing difference of a transmission time of the first communication.

Aspect 28: The method of Aspect 27, wherein the maximum timing difference is, at most, a length of a cyclic prefix of the first communication or the second communication.

Aspect 29: The method of any of Aspects 21-28, further comprising: transmitting information indicating at least one of the first time value or a difference between the first time value and a second time value of the second TRP, wherein the timing pre-compensation value is based at least in part on the first time value or the difference.

Aspect 30: The method of Aspect 29, wherein the information indicating the at least one of the first time value or the difference is based at least in part on a first physical random access channel (PRACH) transmission associated with the first TRP and a second PRACH transmission associated with the second TRP.

Aspect 31: The method of Aspect 29, wherein the difference comprises a reference signal timing difference, and wherein the method further comprises deriving the reference signal timing difference from a downlink reference signal.

Aspect 32: The method of any of Aspects 21-31, further comprising transmitting an indication of a location of the UE, wherein the timing pre-compensation value is based at least in part on the location.

Aspect 33: The method of any of Aspects 21-32, wherein the first communication and the second communication correspond to respective layers of a multi-layer transmission.

Aspect 34: The method of any of Aspects 21-33, wherein the first communication and the second communication use a single-frequency network configuration.

Aspect 35: The method of any of Aspects 21-34, further comprising receiving, from the second TRP, a synchronization signal block or a tracking or radio resource management (RRM) measurement reference signal, wherein the timing pre-compensation value is not applied for the synchronization signal block or the tracking reference signal.

Aspect 36: The method of any of Aspects 21-35, further comprising: receiving, from the second TRP, a synchronization signal block, wherein the timing pre-compensation value is not applied for the synchronization signal block; and receiving, from the second TRP, a tracking or radio resource management (RRM) measurement reference signal using the timing pre-compensation value, wherein the second communication is associated with the timing pre-compensation value and a frequency pre-compensation value.

Aspect 37: The method of any of Aspects 21-36, further comprising: receiving, from the second TRP, a synchronization signal block, wherein the timing pre-compensation value is not associated with the synchronization signal block; and receiving, from the second TRP, a tracking or radio resource management (RRM) measurement reference signal using the timing pre-compensation value, wherein the second communication is associated with the timing pre-compensation value and a frequency pre-compensation value.

Aspect 38: The method of any of Aspects 21-37, further comprising: receiving, from the second TRP, a synchronization signal block, wherein the timing pre-compensation value is not associated with the synchronization signal block; and receiving, from the second TRP, using the timing pre-compensation value and a frequency pre-compensation value, at least one of a tracking or radio resource management (RRM) measurement reference signal, a demodulation reference signal, a physical downlink control channel, or a physical downlink shared channel.

Aspect 39: The method of any of Aspects 21-38, further comprising receiving, from the second TRP, a tracking reference signal using the timing pre-compensation value, wherein the timing pre-compensation value is derived from the tracking reference signal.

Aspect 40: The method of any of Aspects 21-39, further comprising receiving, from a third TRP, a third communication using another timing pre-compensation value relative to the first time value or relative to the timing pre-compensation value of the second TRP.

Aspect 41: An apparatus for wireless communication at a device, comprising a processor; memory coupled with the processor; and instructions stored in the memory and executable by the processor to cause the apparatus to perform the method of one or more of Aspects 1-40.

Aspect 42: A device for wireless communication, comprising a memory and one or more processors coupled to the memory, the one or more processors configured to perform the method of one or more of Aspects 1-40.

Aspect 43: An apparatus for wireless communication, comprising at least one means for performing the method of one or more of Aspects 1-40.

Aspect 44: A non-transitory computer-readable medium storing code for wireless communication, the code comprising instructions executable by a processor to perform the method of one or more of Aspects 1-40.

Aspect 45: A non-transitory computer-readable medium storing a set of instructions for wireless communication, the set of instructions comprising one or more instructions that, when executed by one or more processors of a device, cause the device to perform the method of one or more of Aspects 1-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a network entity, comprising:

causing a first transmission reception point (TRP) to transmit a first communication using a first time value derived from a first transmission configuration indicator (TCI) state including a set of first quasi co-location (QCL) parameters of the first TRP;

causing a second TRP to transmit a synchronization signal block;

causing the second TRP to transmit a tracking or radio resource management (RRM) measurement reference signal using a timing pre-compensation value relative to the first time value; and causing a second TRP to transmit a second communication using the timing pre-compensation value; and a frequency pre-compensation value relative to a first frequency offset value derived from the first TCI state.

2. The method of claim 1, wherein causing the second TRP to transmit the second communication further comprises causing the second TRP to transmit the second communication using the first time value and not a second time value derived from a second TCI state including one or more second QCL parameters of the second TRP.

3. The method of claim 1, wherein causing the second TRP to transmit the second communication further comprises causing the second TRP to transmit the second communication using a second time value derived from a second TCI state including one or more second QCL parameters of the second TRP and the timing pre-compensation value relative to the first time value.

4. The method of claim 1, wherein the first time value comprises an average delay derived from the first set of QCL parameters of the first TRP.

5. The method of claim 1, wherein causing the first TRP to transmit the first communication further comprises causing the first TRP to transmit the first communication using the first frequency offset value.

6. The method of claim 5, wherein the first frequency offset value comprises a Doppler shift and a Doppler spread derived from the first set of QCL parameters of the first TRP.

7. The method of claim 1, wherein the timing pre-compensation value shifts a transmission time of the second communication to within a maximum timing difference of a transmission time of the first communication.

8. The method of claim 7, wherein the maximum timing difference is, at most, a length of a cyclic prefix of the first communication or the second communication.

9. The method of claim 1, further comprising:

receiving information indicating at least one of the first time value or a difference between the first time value and a second time value of the second TRP; and identifying the timing pre-compensation value based at least in part on the first time value or the difference.

10. The method of claim 9, wherein the information indicating the at least one of the first time value or the difference is based at least in part on a first physical random access channel (PRACH) transmission associated with the first TRP and a second PRACH transmission associated with the second TRP.

11. The method of claim 9, wherein the difference comprises a reference signal timing difference derived from a downlink reference signal.

12. The method of claim 1, wherein the timing pre-compensation value is based at least in part on a location of a user equipment.

13. The method of claim 1, further comprising causing the second TRP to transmit a reference signal using the timing pre-compensation value.

14. The method of claim 1, wherein the first communication and the second communication correspond to respective layers of a multi-layer transmission.

15. The method of claim 1, wherein the first communication and the second communication use a single-frequency network configuration.

16. The method of claim 1, further comprising causing the second TRP to transmit a synchronization signal block or a tracking or radio resource management (RRM) measurement reference signal, wherein the timing pre-compensation value is not applied for the synchronization signal block or the tracking or RRM measurement reference signal.

17. The method of claim 1, further comprising:

causing the second TRP to transmit, using the timing pre-compensation value and a frequency pre-compensation value, at least one of a, a demodulation reference signal, a physical downlink control channel, or a physical downlink shared channel.

18. The method of claim 1, wherein the timing pre-compensation value is an initial timing pre-compensation value, and wherein the timing pre-compensation value is derived from the tracking or RRM measurement reference signal or the initial timing pre-compensation value.

19. The method of claim 1, further comprising causing a third TRP to transmit a third communication using another timing pre-compensation value relative to the first time value or relative to the timing pre-compensation value of the second TRP.

20. A method of wireless communication performed by a user equipment (UE), comprising:

receiving a first communication from a first transmission reception point (TRP), the first communication being associated with a first time value derived from a first transmission configuration indicator (TCI) state including a set of first quasi co-location (QCL) parameters of the first TRP;

receiving a synchronization signal block from a second TRP;

receiving a tracking or radio resource management (RRM) measurement reference signal from the second TRP, the tracking or RRM measurement reference signal being associated with a timing pre-compensation value relative to the first time value; and receiving a second communication from the second TRP, the second communication being associated with the timing pre-compensation value and a frequency pre-compensation value a first frequency offset value derived from the first TCI state.

21. The method of claim 20, wherein the second communication uses the first time value and not a second time value derived from a second TCI state including one or more second QCL parameters of the second TRP.

22. The method of claim 20, wherein the second communication uses a second time value derived from a second TCI state including one or more second QCL parameters of the second TRP and the timing pre-compensation value relative to the first time value.

23. The method of claim 20, wherein the first time value comprises an average delay derived from the first set of QCL parameters of the first TRP.

24. The method of claim 20, wherein the first communication uses the first frequency offset value derived from the first TCI state.

25. The method of claim 24, wherein the first frequency offset value comprises a Doppler shift and a Doppler spread derived from the first set of QCL parameters of the first TRP.

26. The method of claim 20, wherein the timing pre-compensation value shifts a transmission time of the second communication to within a maximum timing difference of a transmission time of the first communication.

27. The method of claim 26, wherein the maximum timing difference is, at most, a length of a cyclic prefix of the first communication or the second communication.

28. A network entity for wireless communication, comprising:

a memory; and one or more processors, coupled to the memory, configured to:

cause a first transmission reception point (TRP) to transmit a first communication using a first time value derived from a first transmission configuration indicator (TCI) state including a set of first quasi co-location (QCL) parameters of the first TRP;

cause a second TRP to transmit a synchronization signal block;

cause the second TRP to transmit a tracking or radio resource management (RRM) measurement reference signal using a timing pre-compensation value relative to the first time value; and cause a second TRP to transmit a second communication using the timing pre-compensation value and a frequency pre-compensation value a first frequency offset value derived from the first TCI state.

29. A user equipment (UE) for wireless communication, comprising: a memory; and one or more processors, coupled to the memory, configured to:

receive a first communication from a first transmission reception point (TRP), the first communication being associated with a first time value derived from a first transmission configuration indicator (TCI) state including a set of first quasi co-location (QCL) parameters of the first TRP;

receive a synchronization signal block from a second TRP;

receive a tracking or radio resource management (RRM) measurement reference signal from the second TRP, the tracking or RRM measurement reference signal being associated with a timing pre-compensation value relative to the first time value; and receive a second communication from the second TRP, the second communication being associated with the timing pre-compensation value and a frequency pre-compensation value a first frequency offset value derived from the first TCI state.

30. The method of claim 1, further comprising causing the second TRP to adjust at least one of the timing pre-compensation value or the frequency pre-compensation according to a difference between receipt of an uplink sounding reference signal from a user equipment (UE) and transmission of a reference signal from the second TRP.

* * * * *